United States Patent
Hennessy et al.

(10) Patent No.: US 10,612,605 B2
(45) Date of Patent: Apr. 7, 2020

(54) VISCOUS CLUTCH FLUID CAPTURE SYSTEM

(71) Applicant: Horton, Inc., Roseville, MN (US)

(72) Inventors: David R. Hennessy, Burnsville, MN (US); Michael Stevens, St. Paul, MN (US)

(73) Assignee: Horton, Inc., Roseville, MN (US)

( * ) Notice: Subject to any disclaimer, the term of this patent is extended or adjusted under 35 U.S.C. 154(b) by 0 days.

(21) Appl. No.: 15/780,415

(22) PCT Filed: Dec. 2, 2016

(86) PCT No.: PCT/US2016/064681
§ 371 (c)(1),
(2) Date: May 31, 2018

(87) PCT Pub. No.: WO2017/096202
PCT Pub. Date: Jun. 8, 2017

(65) Prior Publication Data
US 2018/0355925 A1    Dec. 13, 2018

Related U.S. Application Data

(63) Continuation-in-part of application No. PCT/US2016/055258, filed on Oct. 4, 2016.
(Continued)

(51) Int. Cl.
*F16D 35/02* (2006.01)
*F16D 35/00* (2006.01)
*F16D 121/20* (2012.01)

(52) U.S. Cl.
CPC ......... *F16D 35/024* (2013.01); *F16D 35/005* (2013.01); *F16D 35/02* (2013.01); *F16D 2121/20* (2013.01); *F16D 2300/0212* (2013.01)

(58) Field of Classification Search
CPC ...... F16D 35/024; F16D 35/005; F16D 35/02; F16D 2300/0212; F16D 2121/20; F16D 35/021
See application file for complete search history.

(56) References Cited

U.S. PATENT DOCUMENTS

| 822,802 A | 6/1906 | Wilkinson |
| 3,045,430 A | 7/1962 | Becker |

(Continued)

FOREIGN PATENT DOCUMENTS

| CN | 104685252 A | 6/2015 |
| CN | 105089767 A | 11/2015 |

(Continued)

OTHER PUBLICATIONS

Chinese Office Action issued in corresponding Chinese application No. 201680070513.7, dated Feb. 25, 2019.
(Continued)

*Primary Examiner* — David J Hlavka
(74) *Attorney, Agent, or Firm* — Westman, Champlin & Koehler, P.A.

(57) ABSTRACT

A viscous clutch includes an input member, an output member, a working chamber, a reservoir to hold a supply of a shear fluid, an outlet, a return bore, an accumulator, and a first wall having an arcuate segment. The reservoir is connected to the working chamber by a fluid circuit, along which the outlet passes the shear fluid from the reservoir to the working chamber and the return bore returns the shear fluid pumped out of the working chamber to the accumulator. The accumulator is arranged in series with the reservoir in the fluid circuit. The first wall is positioned within the reservoir to separate a first portion from a second portion.

33 Claims, 7 Drawing Sheets

Related U.S. Application Data

(60) Provisional application No. 62/262,565, filed on Dec. 3, 2015.

(56) References Cited

U.S. PATENT DOCUMENTS

| | | | |
|---|---|---|---|
| 3,259,220 A | 7/1966 | Roper |
| 3,444,748 A | 5/1969 | Sutaruk |
| 3,670,498 A | 6/1972 | Becker |
| 3,899,887 A | 8/1975 | Becker |
| 4,134,484 A | 1/1979 | Lansinger |
| 4,312,433 A | 1/1982 | Bopp |
| 4,318,311 A | 3/1982 | Bopp |
| 4,351,426 A | 9/1982 | Bopp |
| 4,362,226 A | 12/1982 | Gee |
| 4,467,747 A | 8/1984 | Braatz et al. |
| 4,560,331 A | 12/1985 | Sanderson |
| 4,570,771 A | 2/1986 | Yamaguchi |
| 4,574,929 A | 3/1986 | Hayashi et al. |
| 4,665,694 A | 5/1987 | Brunken |
| 4,667,791 A | 5/1987 | Martin et al. |
| 4,784,247 A | 11/1988 | Nakamura |
| 4,903,805 A | 2/1990 | Ono |
| 4,930,458 A | 6/1990 | Takikawa et al. |
| 5,022,507 A | 6/1991 | Kennedy et al. |
| 5,042,629 A | 8/1991 | Elmer |
| 5,099,803 A | 3/1992 | Nakamura |
| 5,101,950 A | 4/1992 | Schoenmeyer |
| 5,113,987 A | 6/1992 | Drennen et al. |
| 5,119,921 A | 6/1992 | Drennen et al. |
| 5,125,491 A | 6/1992 | Takikawa et al. |
| 5,152,383 A | 10/1992 | Boyer et al. |
| 5,232,074 A | 8/1993 | Watanabe |
| 5,400,823 A | 3/1995 | Elmer |
| 5,452,782 A | 9/1995 | Inoue |
| 5,499,706 A | 3/1996 | Kawada |
| 5,501,183 A | 3/1996 | Takayama |
| 5,558,192 A | 9/1996 | Muehlbach et al. |
| 5,853,074 A | 12/1998 | Takahahi et al. |
| 5,855,265 A | 1/1999 | Kennedy |
| 5,893,442 A | 4/1999 | Light |
| 5,992,594 A | 11/1999 | Herrle et al. |
| 6,056,098 A | 5/2000 | Brown et al. |
| 6,085,881 A | 7/2000 | Robb |
| 6,336,538 B1 | 1/2002 | Katoh |
| 6,752,251 B2 | 6/2004 | May et al. |
| 6,814,033 B2 | 11/2004 | Ito et al. |
| 6,935,478 B2 | 8/2005 | Dräger et al. |
| 7,293,636 B2 | 11/2007 | May |
| 7,581,627 B2 | 9/2009 | McDermott et al. |
| 7,600,623 B1 | 10/2009 | Pinto |
| 7,621,386 B2 | 11/2009 | Light |
| 7,886,886 B2 | 2/2011 | Schultheiss et al. |
| 7,913,826 B2 | 3/2011 | Boyer |
| 7,963,380 B2 | 6/2011 | Light et al. |
| 8,602,190 B2 | 12/2013 | May |
| 8,701,852 B2 | 4/2014 | Boyer |
| 8,851,257 B2 | 10/2014 | Rothoff et al. |
| 9,157,532 B2 | 10/2015 | Greaves |
| 9,328,781 B2 | 5/2016 | Kubota et al. |
| 2003/0230460 A1 | 12/2003 | Usui et al. |
| 2004/0084273 A1* | 5/2004 | May ............... F16D 35/024 |
| | | | 192/58.61 |
| 2005/0045443 A1 | 3/2005 | Tilly |
| 2006/0243817 A1 | 11/2006 | Light et al. |
| 2007/0023250 A1 | 2/2007 | Mepham et al. |
| 2007/0205071 A1 | 9/2007 | Light |
| 2010/0025177 A1 | 2/2010 | Fukushima et al. |
| 2014/0216881 A1 | 8/2014 | Tilly |
| 2015/0240888 A1 | 8/2015 | Schmidt et al. |
| 2015/0330463 A1 | 11/2015 | Kubota et al. |

FOREIGN PATENT DOCUMENTS

| | | |
|---|---|---|
| DE | 3819519 A1 | 12/1989 |
| DE | 19741073 A1 | 3/1999 |
| DE | 19810905 A1 | 9/1999 |
| DE | 19925132 A1 | 12/2000 |
| EP | 0294594 A1 | 12/1988 |
| EP | 0481584 A1 | 4/1992 |
| EP | 1418361 A2 | 5/2004 |
| GB | 2087048 A | 5/1982 |
| GB | 2185555 B | 5/1990 |
| JP | 57-179431 A | 11/1982 |
| WO | 2005098256 A2 | 10/2005 |
| WO | 2010070414 A2 | 6/2010 |
| WO | 2014047430 A1 | 3/2014 |
| WO | 20140159374 A1 | 10/2014 |
| WO | WO2017096202 A1 | 6/2017 |

OTHER PUBLICATIONS

Supplementary European Search Report issued in corresponding European application No. 16854152, dated Feb. 4, 2019.

Supplementary European Search Report issued in Corresponding European Patent Application No. EP16871598, dated Jul. 29, 2019.

International Search Report and Written Opinion of the International Search Authority dated Jan. 11, 2017, for corresponding international Application PCT/US2016/055258, filed Oct. 4, 2016.

International Search Report and Written Opinion of the International Search Authority dated Mar. 16, 2017, for corresponding International Application PCT/US2016/064681, filed Dec. 2, 2016.

Chinese Office Action issued in corresponding Chinese application No. 201680057783.4, dated Mar. 14, 2019.

Chinese Office Action issued in corresponding Chinese application No. 201680057895.X, dated Mar. 13, 2019.

Chinese Office Action issued in corresponding Chinese application No. 201680070513.7, dated Sep. 27, 2019.

Chinese Office Action issued in corresponding Chinese application No. 201680070513.7, dated Jun. 19, 2019.

Extended European Search Report dated May 29, 2019, in corresponding European patent application No. EP16854150.

\* cited by examiner

VISCOUS CLUTCH FLUID CAPTURE SYSTEM

CROSS-REFERENCE TO RELATED APPLICATIONS

This Application is a Section 371 National Stage Application of International Application No. PCT/US2016/064681, filed Dec. 2, 2016, and published as WO/2017/096202 on Jun. 8, 2017, in English, the contents of which is hereby incorporated by reference in its entirety. This International application claims priority to International Application PCT/US2016/055258 (filed Oct. 4, 2016) and to U.S. Provisional Patent Application Ser. No. 62/262,565 (filed Dec. 3, 2015).

FIELD

The present invention relates to viscous clutches, and, more particularly, to a fluid capture system to reduce or prevent "morning sickness" in viscous clutches.

BACKGROUND

Viscous clutches are used in a wide variety of automotive fan drive applications, among other uses. These clutches employ a relatively thick shear fluid or viscous fluid (typically silicone oil) for the selective transmission of torque between two rotating components. It is possible to engage or disengage the clutch by selectively allowing the shear fluid into and out of a working area of the clutch located between input and output members (e.g., between an input rotor and an output housing). A valve is used to control the flow of the shear fluid in the working area between the input and the output members. Recent clutch designs have been employed that allow the shear fluid to be stored in the rotating input portion of the clutch while the clutch is disengaged, in order to keep kinetic energy available to the shear fluid to allow rapid engagement of the clutch from the off condition. This also allows the clutch have a very low output speed (e.g., fan speed) while in the off position. It has also become common for the clutch to be controlled electrically. This has been done to increase the controllability of the clutch, and to also have the clutch capable of responding to multiple cooling needs in a vehicle. Some of the possible cooling needs are coolant temperature, intake air temperature, air conditioning pressure, and oil temperature.

However, viscous clutches suffer from a problem commonly referred to as "morning sickness". The problem of morning sickness arises because of the presence of openings or bores that fluidically connect the reservoir and the working chamber. When the clutch is "off", such as when a vehicle in which the clutch is installed sits unused overnight, the shear fluid can drain back from the reservoir into the working chamber. The drain-back problem is often dependent upon the rotational (or angular) orientation of the clutch when the clutch comes to rest, with gravity tending to induce relatively large volumes of drain back fluid into the working chamber when an opening or bore is rotated so as to be in a lower part of the clutch where that fluid settles. When the vehicle is started, such as a "cold start" the next morning after non-use overnight, the migration or drain-back of the shear fluid into the working chamber can cause significant engagement between the input and output members. For a fan clutch, this can cause relatively high speed fan engagement upon vehicle start-up, which can generate unwanted noise and unwanted cooling effects. Even though the clutch will eventually pump unwanted shear fluid out of the working area to disengage the output member, it would be more desirable to reduce or avoid any time period of clutch engagement due to morning sickness fluid drain-back.

A variety of solutions have been proposed to address the problem of "morning sickness". Many of those known designs utilize relatively complex structures that make clutch manufacturing and assembly more difficult. Moreover, known morning sickness prevention mechanisms can undesirably increase a size of the clutch in the radial and/or axial direction.

Therefore, it is desired to provide an alternative viscous clutch system that reduces "morning sickness".

SUMMARY

A viscous clutch according to one aspect of the present invention includes an input member, an output member, a working chamber defined between the input member and the output member, a reservoir to hold a supply of a shear fluid, an outlet, a return bore, an accumulator to accept the shear fluid from the return bore, and a first wall having an arcuate segment. The reservoir is fluidically connected to the working chamber by a fluid circuit. The outlet is configured to pass the shear fluid from the reservoir to the working chamber along the fluid circuit, and the return bore is configured to return the shear fluid pumped out of the working chamber along the fluid circuit. The accumulator is arranged in series with the reservoir in the fluid circuit. The first wall is positioned within the reservoir to separate a first portion of the reservoir from a second portion of the reservoir.

In another aspect, a method for use with a viscous clutch includes pumping a shear fluid radially inward from a working chamber to an accumulator, passing the shear fluid from the accumulator to a reservoir having a closed configuration, separating a first portion of the reservoir from a second portion of the reservoir with a first arcuate wall located within the reservoir, delivering the shear fluid from the reservoir to the working chamber, and bringing the viscous clutch to rest in an idle condition. Portions of the shear fluid are retained in both the accumulator and the first portion of the reservoir in the idle condition to reduce drain back from the reservoir to the working chamber.

In yet another aspect, a method for use with a viscous clutch includes pumping a shear fluid radially inward from a working chamber to an accumulator, passing the shear fluid from the accumulator to a reservoir having a closed configuration, moving all of the shear fluid from the accumulator along a reservoir path having a tortuous shape that traverses an angular range of at least 540° relative to an axis of the clutch, delivering the shear fluid from the reservoir to the working chamber, and bringing the viscous clutch to rest in an idle condition. Portions of the shear fluid are retained in both the accumulator and an upstream portion of the reservoir path in the idle condition to reduce drain back from the reservoir to the working chamber.

The present summary is provided only by way of example, and not limitation. Other aspects of the present invention will be appreciated in view of the entirety of the present disclosure, including the entire text, claims and accompanying figures.

Figure 1:
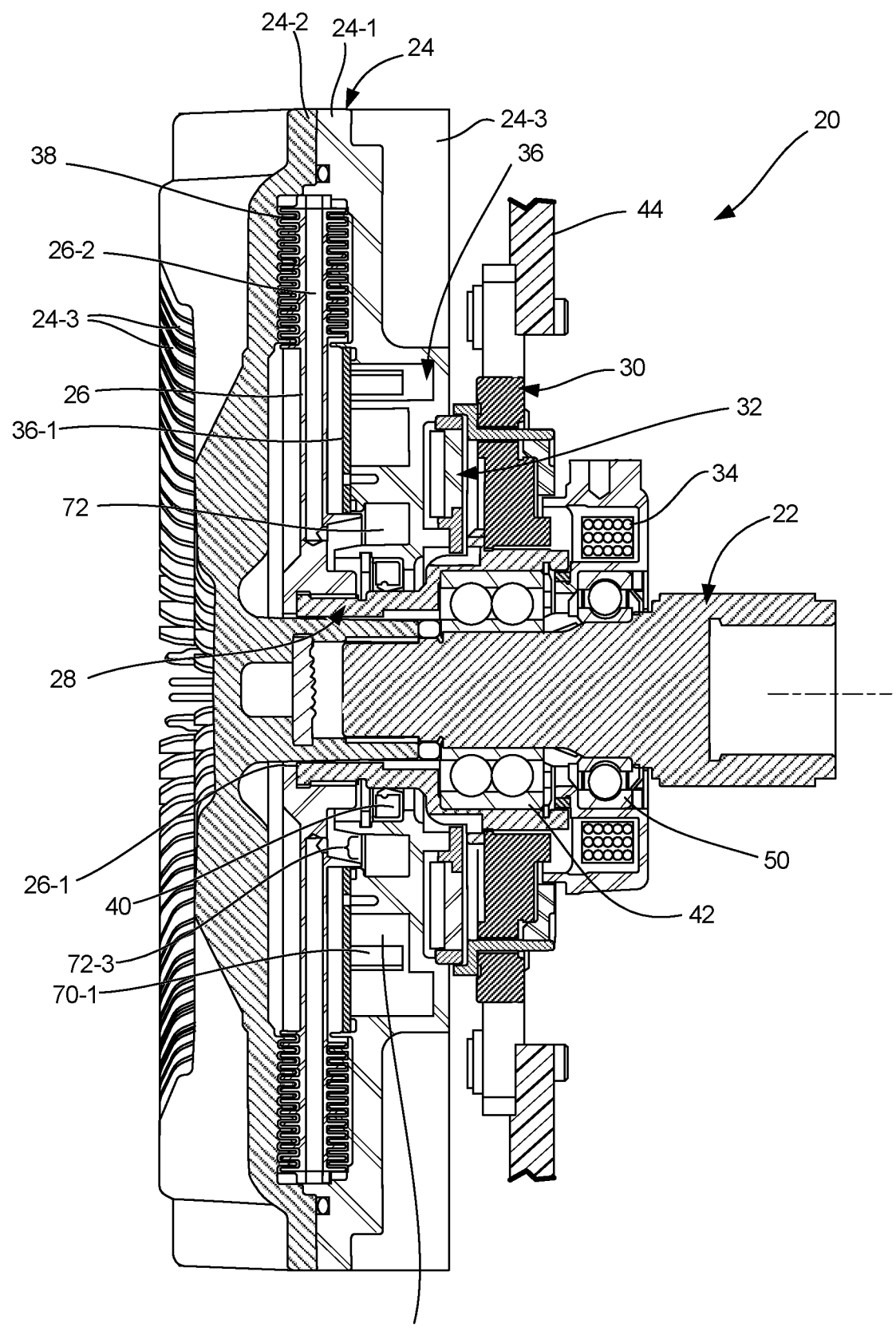
FIG. 1 is a cross-sectional view of an embodiment of a viscous clutch according to the present invention.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

In general, the present invention relates to a viscous clutch having an input member (e.g., a rotor disk), an output member (e.g., a housing), a working chamber between the input and output members, and a reservoir for holding a supply of a shear fluid (e.g., silicone oil). Engagement and disengagement of the clutch can control rotation of a component coupled to the output member, such as a fan. The clutch can be selectively engaged by moving shear fluid from the reservoir to the working chamber, which creates a torque coupling between the input and output members at a given slip speed. The reservoir is designed to trap a quantity of shear fluid when the clutch is in an idle or "off" state, without a rotational input, to help reduce a phenomenon known as "morning sickness", which typically occurs when the shear fluid can passively drain back from the reservoir into the working chamber during the idle state. Numerous embodiments are disclosed for accomplishing morning sickness reduction. In certain embodiments, at least one partial wall is provided within the reservoir to divide portions of the reservoir from each other and to separate and isolate fluid in one or more portions of the reservoir from one or more other portions of the reservoir. The wall(s) can have an arcuate (e.g., circular arc-shape, spiral/helical, etc.) segment, as described further below, or have various other suitable shapes and configurations. The reservoir can be closed, meaning that the reservoir can be essentially sealed except for two bores, forming an inlet and an outlet, respectively. In some embodiments, the wall(s) allow one or more portions of the reservoir to capture (that is, accumulate and temporarily retain) at least a portion of the shear fluid, isolated from any inlet or outlet bores, to reduce or prevent shear fluid drain-back and other "morning sickness" effects. In other embodiments, the wall(s) create a tortuous path between inlet and outlet bores; such a tortuous path can extend about an axis of the clutch through an angular range of 180° or more (such as 360° or more). The wall(s) can provide a fluid space with a varying cross-sectional area in some embodiments, such that shear fluid can be stored away from bores. An accumulator can be provided adjacent to and/or upstream of the reservoir in some embodiments, to limit "morning sickness" effects. The accumulator can be used in conjunction with any embodiment of the partial wall(s) within the reservoir, or can be used alone (i.e., without any wall within the reservoir). These features and benefits are described merely by way of example and not limitation. Numerous other features and benefits of the present invention will be recognized by those of ordinary skill in the art in view of the entirety of the present disclosure, including the accompanying figures.

The present application is based on and claims the benefit of U.S. provisional patent application Ser. No. 62/262,565, filed Dec. 3, 2015, and further claims priority to International patent application Ser. No. PCT/US2016/55258, filed Oct. 4, 2016, the contents of which are each hereby incorporated by reference in their entireties.

FIG. 1 is a cross-sectional view of an embodiment of a viscous clutch 20 that includes a shaft 22, a multi-part housing (or housing assembly) 24, a rotor 26, a hub 28, a mounting disk 30, a valve assembly 32 (only partly visible in FIG. 1), an electromagnet 34, a reservoir 36, and a working chamber 38. Additional components are discussed below. Features of the viscous clutch 20 can be the same as or similar to those disclosed in International patent application Ser. No. PCT/US2016/55258.

The shaft 22 in the illustrated embodiment is a "live" center shaft, meaning that the shaft 22 is rotatable and is located at a center of the clutch 20 defined by an axis of rotation A. The shaft 22 extends axially through at least part of the housing 24, and is rotatably fixed to the housing 24 at or near a front face of the housing 24. In the illustrated embodiment, the shaft 22 can act as a primary structural support for the entire clutch 20, which is to say that mass of the clutch 20 can be supported primarily (or entirely) by the shaft 22. The shaft 22 can be connected to a torque input, such as a driveshaft of an engine (not shown), so that the shaft 22 accepts an input torque and acts as a driving or input member for the clutch 20.

The housing 24 includes a base 24-1 and a cover 24-2 secured to each other in a rotationally fixed manner. In the illustrated embodiment, one end of the shaft 22 is affixed to a center sleeve (or hub) of the cover 24-2, and the base 24-1 is indirectly supported on the shaft 22 by the cover 24-2. In this way, the base 24-1 has a cantilevered or semi-cantilevered configuration. The housing 24 can be made of aluminum or another suitable material. Cooling fins 24-3 can be provided on external surfaces of the housing 24, on the base 24-1 and/or the cover 24-2, to facilitate heat dissipation to ambient air. One or more seals 40 can also be provided along the housing 24 (e.g., between the base 24-1 and the hub 28) to help retain shear fluid within the clutch 20. Because the housing 24 is rotationally fixed to the shaft 22, the housing 24 rotates whenever the shaft 22 rotates. When the shaft 22 accepts torque input to the clutch 20, the housing 24 rotates at an input speed as a function of a torque input to the shaft 22, with both the housing 24 and the shaft 22 rotating whenever there is torque input to the clutch 20. In that way, the cooling fins 24-3 can rotate with the housing 24 at the input speed whenever input torque is provided to the clutch 20, which helps enhance heat dissipation as compared to having fins on an output member that rotates only when the clutch is engaged.

The rotor 26 is positioned at least partially within the housing 24, and preferably entirely within the housing 24, and can have a disk-like shape with a central opening 26-1. The rotor 26 can be made of aluminum or another suitable material. When the shaft 22 and the housing 24 act as torque input members of the clutch 20, the rotor 26 (together with the hub 28 and the mounting disk 30) acts as a torque output member. In the illustrated embodiment, the shaft 22 and/or a portion of the housing 24 passes through the central opening 26-1 in the rotor 26, separated by a small radial gap, allowing transmission of torque from the shaft 22 to the housing 24 along a torque transmission path.

The working chamber 38 is defined (and operatively positioned) between the rotor 26 and the housing 24. The working chamber 38 can extend to both sides of the rotor 26. As explained further below, selective introduction of a shear fluid (e.g., silicone oil) to the working chamber 38 can engage the clutch 20 by creating a viscous shear coupling to transmit torque between the housing 24 and rotor 26, with the degree of torque transmission (and associated output slip speed) being variable a function of the volume of shear fluid present in the working chamber 38. Concentric annular ribs, grooves and/or other suitable structures can be provided on the rotor 26 and housing 24 to increase surface area along the working chamber 38 and promote a shear coupling when the shear fluid is present in the working chamber 38, as is known in the art. The rotor 26 can further include a fluid return bore 26-2 that extends generally radially from the working chamber 38 to the reservoir 36, as explained further below.

The hub 28 is a generally axially-extending, sleeve-like member that can serve multiple functions, including providing structural support for various clutch components, a torque transmission path, and part of a magnetic flux circuit. The rotor 26 is rotationally fixed to the hub 28, and the hub 28 is further rotationally fixed to the mounting disk 30, which can act as an output of the clutch 20. The hub 28 can be affixed to the rotor 26 at or near the central opening 26-1. Additionally, the hub 28 can be rotationally supported on the shaft 22 by a bearing set 42. It should be noted that the particular configuration of the hub 28 shown in the drawings and described above is provided merely by way of example, and not limitation. For instance, a portion of the hub 28 could be integrated with the rotor 26 or have a different (e.g., non-stepped) shape in further embodiments, and an additional bearing set can optionally be provided proximate to the rotor 26. The hub 28 can be made of a suitable magnetic flux-conducting material, such as a ferromagnetic material like steel, in order to serve as part of a flux circuit, as explained further below.

The mounting disk 30 is rotationally fixed to the hub 28, which provides a rotational coupling (e.g., a fixed or direct rotational torque coupling) between the rotor 26 and the mounting disk 30, enabling the mounting disk 30 to co-rotate at the same speed as the rotor 26 (e.g., at the output slip speed). An output device 44, such as a fan, can be connected and rotationally fixed to the mounting disk 30. The mounting disk 30 can be positioned at or near a rear face of the housing 24, and at least a portion of the mounting disk 30 extends outside the housing 24. Such a configuration allows for a rear mount of the output device 44, and, in an embodiment where the output device 44 is a fan, allows the fan to be positioned behind the clutch 20 (i.e., between the clutch 20 and the location where the live shaft 22 is mounted).

The valve assembly 32 selectively controls flow of the shear fluid between the reservoir 36 and the working chamber 38. In the illustrated embodiment, the reservoir 36 is provided on or within the housing 24, and more particularly in the base 24-1 of the housing 24, and a plate 36-1 of the reservoir 36 can be attached to and carried by the housing 24 to form a boundary to help retain the shear fluid and to separate the reservoir 36 from other portions of the clutch 20. The plate 36-1 can be located in an interior of the clutch 20, and can be arranged to face the rotor 26. The shear fluid can be stored in the reservoir 36 when not needed for engagement of the clutch 20. In the illustrated embodiment, the reservoir 36 is carried by the housing 24, such that the reservoir 36 and shear fluid contained within both rotate with the housing 24. In this way, when the shaft 22 and the housing 24 act as an input to the clutch 20, the reservoir 36 rotates at input speed whenever there is a torque input to the clutch 20, which imparts kinetic energy to the shear fluid in the housing-carried reservoir 36 to facilitate relatively quick clutch engagement response times. Furthermore, because the reservoir 36 is carried by the housing 24, which is an exterior component of the clutch 20, the reservoir 36 and the shear fluid contained therein are located in close physical proximity to the both ambient air and the fins 24-3, which facilitates heat dissipation as compared to clutches having a reservoir on or carried by interior clutch components (like the rotor).

The clutch 20 can be electromagnetically controlled, meaning that selective energization of the electromagnet 34 can control operation of the valve assembly 32, and in turn the degree of engagement between the input and output members. Although not all of the subcomponents of the valve assembly 32 are visible in FIG. 1, magnetic flux from the electromagnet 34 can move (e.g., translate) an armature, which in turn can move (e.g., translate) a control rod, which in turn can move (e.g., pivot) a valve element. The valve element can limit or prevent flow of the shear fluid out of the reservoir 36 when in a closed position. In some embodiments, referred to as a "fail on" configuration, the valve element can be mechanically biased to an open position by default, with energization of the electromagnet 34 causing the valve element to move to the closed position. In some embodiments, the configuration and operation of the valve assembly 32 can be similar to that described in commonly-assigned PCT Patent Application Pub. No. WO2014/047430A1 or International patent application Ser. No. PCT/US2016/55258. However, it should be noted that the particular configuration of the valve assembly 32 disclosed herein is provided merely by way of example and not limitation. Numerous other types of valve configurations can be utilized in alternative embodiments, such as valves with pivoting or rotating elements, as well as valves that selectively cover the fluid return bore 26-2. Moreover, bimetal-controlled valve assemblies can be used in the further embodiments instead of an electromagnetically controlled valve assembly, as are well-known in the art.

Accumulators/chambers 70 and/or 72 can also be provided in the clutch 20, as discussed further below.

Figure 2:
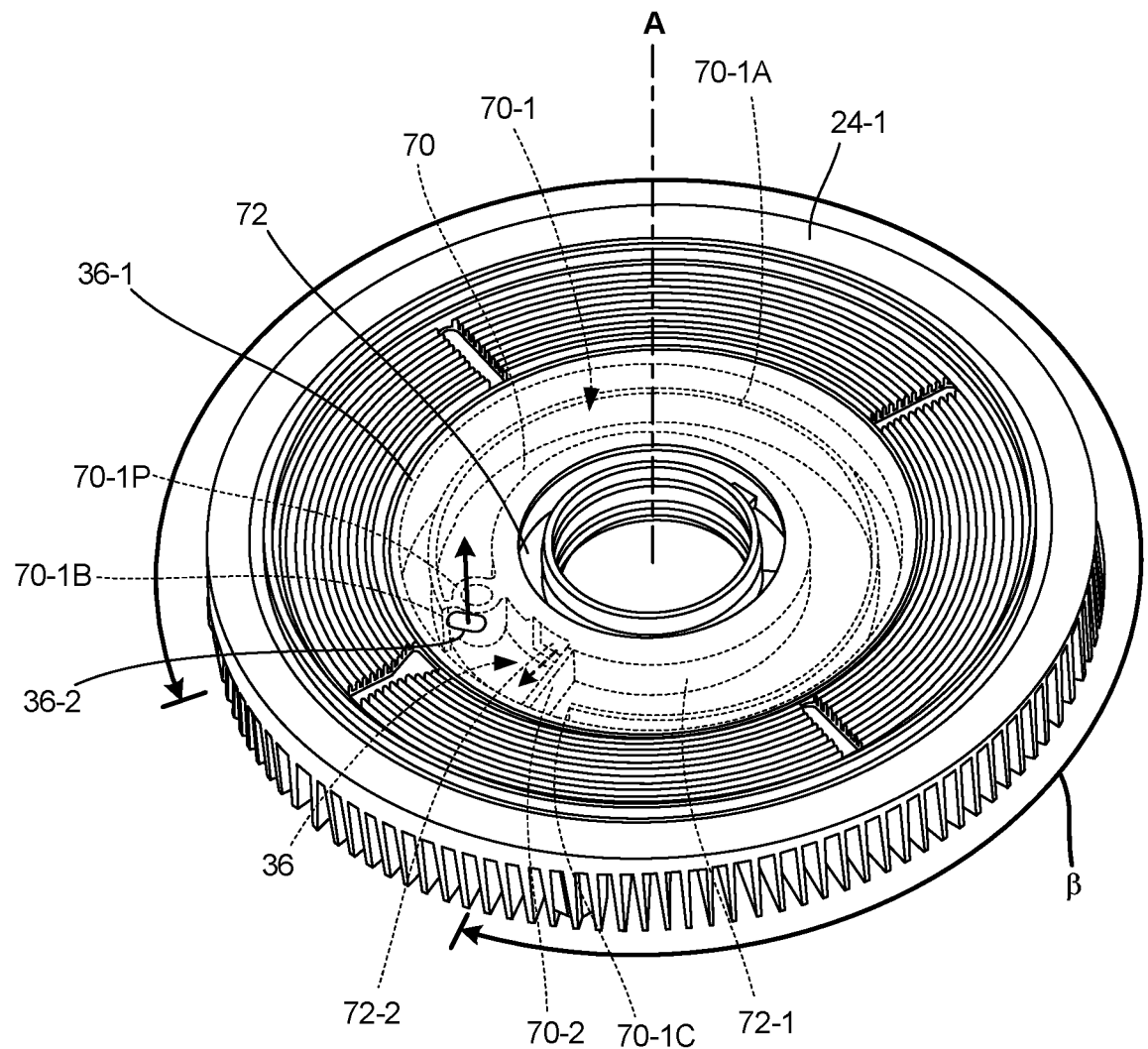
FIG. 2 is a perspective view of a portion of the clutch of FIG. 1.

FIG. 2 is a perspective view of a portion of the clutch 20, including the base 24-1 of the housing 24 and the reservoir 36, shown in isolation. As shown in FIG. 2, an outlet bore or port 36-2 is formed along a boundary of the reservoir 36 to allow the shear fluid to leave the reservoir 36 for delivery to the working chamber 38. In the illustrated embodiment, the outlet bore 36-2 is formed in the plate 36-1, at a location radially inward from a radially outer perimeter of the plate 36-1, and allows the shear fluid to pass out of the reservoir 36 in a substantially axial direction (i.e., parallel to the axis A of the clutch 20). The outlet bore 36-2 can be selectively covered and uncovered by the valve element of the valve assembly 32 (not shown in FIG. 2), which governs how much of the shear fluid can flow out of the reservoir 36 and to the working chamber 38 and thereby control the slip speed of the clutch 20. It should be noted that in alternate embodiments the plate 36-1 can be integrally and monolithically formed with other structures forming all or part of the boundary of the reservoir 36. In the illustrated embodiment, the reservoir 36 is closed, such that the shear fluid can only enter or leave the reservoir 36 through two openings, the outlet bore 36-2 and an inlet bore (described below).

During operation of the clutch 20, the shear fluid can be continually pumped from the working chamber 38 back to the reservoir 36 through the return bore 26-2. The return bore passes through the rotor 26 in the illustrated embodiment, but in alternative embodiments could be in the housing 24 (e.g., in the cover 24-2). A dam or baffle can be positioned adjacent to the return bore 26-2 in the working chamber 38 to facilitate pumping the shear fluid back to the reservoir 36, in a manner well-known in the art.

A fluid circuit is provided by the clutch 20. The shear fluid can move along the fluid circuit during operation of the clutch 20. In brief, the fluid circuit can extend from the reservoir 36 to the working chamber 38 via the outlet bore 36-2, then from the working chamber back to the reservoir 36 via the return bore 26-2. In the illustrated embodiment, the fluid circuit also passes through the accumulator 72, which is arranged in between the return bore 26-2 and the reservoir 36 (in flow series). As already noted, flow of the shear fluid through the outlet bore 36-2 can be selectively controlled by the valve assembly 32. In at least some alternate embodiments, a reservoir path can be formed within the reservoir 36, to create a tortuous path traveled by at least some of the shear fluid held in the reservoir.

The present invention includes embodiments of features to help reduce or prevent so-called "morning sickness" when a clutch receives a rotational input after a period of inactivity (i.e., an idle period). "Morning sickness" relates to shear fluid draining back to the working chamber while idle (i.e., without any input torque), such that the clutch engages briefly before the shear fluid can be pumped back to the reservoir upon receipt of an input torque. It is desirable for the viscous clutch 20 to retain as much of the shear fluid as possible away from the working chamber 38, such as in the reservoir 36, when the clutch 20 is not used for an extended period of time.

The reservoir 36 can be partitioned or otherwise divided into separate portions to facilitate capture and retention of the shear fluid during idle conditions to reduce or prevent morning sickness effects, that is, drain-back of the shear fluid to the working chamber 38. To that end, the sub-chamber (or accumulator) 70 can be defined within the reservoir 36 by a wall 70-1 having an arcuate segment 70-1A that extends over an angular range β with respect to the axis A of the clutch 20 between opposite ends 70-1B and 70-1C. In some embodiments, the angular range β can be selected such that $180° \leq \beta < 360°$ (in alternative embodiments discussed below, the angular range β of a wall within a reservoir can be greater than 360°). In some preferred embodiments, the angular range β is relatively large, such as greater than 270°. In the illustrated embodiment, the angular range β is approximately 315°.

A projection 70-1P can be provided at or near the end 70-1B of the wall 70-1. The projection 70-1P can extend over a radial distance, and can connect the arcuate segment 70-1A of the wall 70-1 to a boundary of the reservoir 36. In the illustrated embodiment, the projection 70-1P extends radially inward from the arcuate segment 70-1A to a radially inner boundary of the reservoir 36, and creates a "dead end" of the sub-chamber (accumulator) 70 such that the shear fluid cannot pass the end 70-1B or otherwise move between inner and outer sides of the wall 70-1 at or near the end 70-1B. In the illustrated embodiment, the projection includes an internal hole or passageway, which is fluidically isolated from the reservoir 36 but provides a space for a control rod of the valve assembly 32 (not shown in FIG. 2) to pass through the reservoir 36 while maintaining the reservoir in a closed configuration.

The end 70-1C of the wall 70-1 can be configured as a "free" end, positioned in a radially middle part of the reservoir 36. In the illustrated embodiment, the free end 70-1C is unconnected to inner and outer boundaries of the reservoir 36. During operation of the clutch 20, the shear fluid can migrate between inner and outer sides of the wall 70-1 at the end 70-1C under certain circumstances. In this respect, an entrance to (and exit from) the sub-chamber 70 is provided at the end 70-1C of the wall 70-1.

The sub-chamber 70 forms a secondary portion of the reservoir 36, which can be located along a radially inner part of the reservoir 36. The shear fluid can enter and exit the sub-chamber 70 only proximate the free end 70-1C. At least a portion of the shear fluid present in the reservoir 36 can enter the sub-chamber 70, and when the clutch 20 is at rest in an idle condition a volume of the shear fluid can be captured and retained in the sub-chamber 70. The amount (i.e., percentage) of the shear fluid retained in the sub-chamber 70 will vary as a function of the orientation of the free end 70-1C at rest, with greater amounts of the shear fluid flowing out of the sub-chamber 70 to another portion of the reservoir 36 by means of gravity when the free end 70-1C is rotationally positioned at or near a bottom-dead-center location, that is, in a lower half of the clutch 20. It should be noted that while there is a torque input to the clutch 20, the shear fluid present in the reservoir 36 need not enter the sub-chamber 70 at all, because centrifugal forces tend to move any of the shear fluid held in the reservoir 36 into a circumferential band at the outer boundary of the reservoir 36, and the fluid circuit of the clutch 20 does not require fluid to flow into the sub-chamber 70. Rather, the sub-chamber 70 provides a "spur" or secondary fluid path that the shear fluid can enter, typically when the clutch 20 is in an idle condition, and gravity rather than centrifugal force is the primary force acting on the shear fluid.

Further, a wall 70-2 can be provided at a given circumferential location that radially spans an entire radial dimension of the reservoir 36, as well as axially spans an entire axial dimension of the reservoir 36, in order to block shear fluid flow within the reservoir 36 across the wall 70-2 in the circumferential direction. In other words, the shear fluid is blocked by the wall 70-2 and prevented from moving circumferentially about a complete 360° circle within the reservoir 36. In the illustrated embodiment, the wall 70-2 has a planar shape and extends purely radially with respect to the axis A. The wall 70-2 can be arranged near the end 70-1B of the arcuate segment of the wall 70-1, with a circumferential space or gap provided between the end 70-1B of the wall 70-1 and the wall 70-2. The space or gap allows the shear fluid to move radially to "turn" around the end 70-1B of the wall 70-1, such that the shear fluid can migrate between inner and outer sides of the wall 70-1 to enter the sub-chamber 70 under certain circumstances. Furthermore, the wall 70-2 can be positioned adjacent to an inlet portion of the reservoir 36, such that the wall 70-2 is located in between the end 70-1B of the wall 70-1 and an inlet to the reservoir 36. Because the wall 70-2 can prevent the shear fluid from passing circumferentially to the outlet bore 36-2, additional amounts of the shear fluid can be retained in the reservoir 36 by the wall 70-2, with the amount of additionally retained shear fluid depending upon the rotational orientation of the wall 70-2 at rest when the clutch 20 is in an idle condition.

The walls 70-1 and/or 70-2 can be integrally and monolithically cast or machined into the base 24-1 of the housing 24. The ability to cast or machine such structures allows the clutch 20 to be manufactured and assembled relatively easily. Alternatively, the walls 70-1 and/or 70-2 can be separate structures attached to the housing 24.

The accumulator 72 can be provided adjacent to (and fluidically upstream of) the reservoir, and separated from the reservoir 36 by a wall 72-1 (e.g., a circumferential wall). In the illustrated embodiment, the accumulator 72 is located radially inward of the reservoir 36 and is axially aligned with the reservoir 36, and the wall 72-1 is a shared or common separating wall that forms a complete circle and defines both a radially outer boundary of the accumulator 72 and a radially inner boundary of the reservoir 36. The accumulator 72 can be carried by and rotationally fixed to the housing 24 (e.g., the base 24-1) or other input member of the clutch 20, such that the accumulator 72 co-rotates with the reservoir 36 at all times (i.e., whenever there is a torque input to the clutch 20). A single, radially-oriented bore or port 72-2 can be provided in the wall 72-1 that allows the shear fluid to flow substantially radially outward from the accumulator 72 to the reservoir 36 during clutch operation at a single circumferential location. In alternate embodiments, the bore 72-2 can have a different orientation, such as an axial orientation. Functionally, the bore 72-2 can be considered an inlet bore to the reservoir 36, an outlet bore from the accumulator 72, and an intermediate bore (with respect to the overall fluid circuit of the clutch 20). Centrifugal forces acting upon the shear fluid allow radially outward flow through the bore 72-2 during operation of the clutch 20. Such radially outward flow from the accumulator 72 to the reservoir 36 is particularly suited to embodiments of the clutch 20 in which the accumulator 72 (or both the accumulator 72 and the reservoir 36) are carried with the input member (e.g., the housing 24).

The accumulator 72 can have an open face 72-3 in an axial direction. In the illustrated embodiment, the open face 70-3 of the accumulator 72 faces forward, that is, faces the rotor 26. The open face 72-3 provides a 360° circumferential entrance or inlet to the accumulator 72. During operation, the return bore 26-2 (see FIG. 1) can deliver the shear fluid from the working chamber 38 to the accumulator chamber 72 through the open face. In embodiments where the return bore 26-2 and the accumulator 72 are located on different ones of the input and output members (in the illustrated embodiment, the return bore 26-2 is in the output rotor 26 and the accumulator 72 is on or carried by the input housing 24), the accumulator 72 can accept the shear fluid from the return bore 26-2 regardless of the relative rotational orientations of the accumulator and the return bore 26-2. The accumulator 72 in the illustrated embodiment is an annular chamber that has no circumferential obstructions, and is configured to allow the shear fluid to flow freely through an entire circumferential volume.

At least a portion of the shear fluid can be retained in the accumulator chamber 72 when the clutch 20 is idle to help reduce morning sickness. The amount (i.e., percentage) of the shear fluid retained in the accumulator 72 will vary as a function of the orientations of the bore 72-2 and the return bore 26-2 at rest. In general, greater amounts of the shear fluid flowing out of the accumulator 72 to the reservoir 36 through the bore 72-2 by means of gravity when the bore 72-2 is rotationally positioned at or near a bottom-dead-center location, that is, in a lower half of the clutch 20. Moreover, when the return bore 26-2 is oriented generally downward at rest, that is, when the return bore 26-2 is rotationally positioned in the lower half of the clutch 20 when at rest in an idle condition, shear fluid in the accumulator 72 can drain back to the working chamber 38. Nonetheless, by allowing the bore 72-2 and the return bore 26-2 to have essentially independent rotational orientations at rest, the clutch 20 can increase the average volume of the shear fluid retained by the accumulator 72 over the range of possible resting orientations. It should be noted that the accumulator chamber 72 can be utilized without the sub-chamber 70 in further embodiments of the clutch 20. Moreover, one or more additional bores can be provided between the accumulator 72 and the reservoir 36 in further embodiments, though a single bore helps to reduce drain-back effects when the clutch 20 is idle. In addition, the open face 72-3 of the accumulator 72 can be only partially open in alternate embodiments (e.g., open over less than 360°), which may be beneficial if the accumulator 72 and the reservoir 36 are not rotationally fixed relative to one another.

Relative internal volumes of the reservoir 36 and the accumulator 72, as well as for sub-portions of the reservoir 36 such as the sub-chamber (accumulator) 70, can vary as desired for particular applications. In the illustrated embodiment, the accumulator 72 has a smaller internal volume than the reservoir 36.

An axial depth of the reservoir 36 and/or the accumulator 72 can also be varied to further promote capture and retention of the shear fluid in idle conditions. Such adjustments can allow tailoring of a volume and/or cross-sectional area of the working chamber 38 relative to volumes of the reservoir 36 and/or the accumulator 72. For instance, protrusions, grooves, and the like in selected portions of the reservoir could help promote shear fluid retention at particular angular (i.e., circumferential) orientations.

Additionally, in alternative embodiments the clutch 20 can include an anti-drainback or morning sickness prevention valve like one disclosed in International patent application Ser. No. PCT/US2016/55260 and U.S. Provisional Patent App. Ser. No. 62/237,286. Various other check valves known in the art can also optionally be used with the clutch 20, as desired for particular applications.

Figure 3:
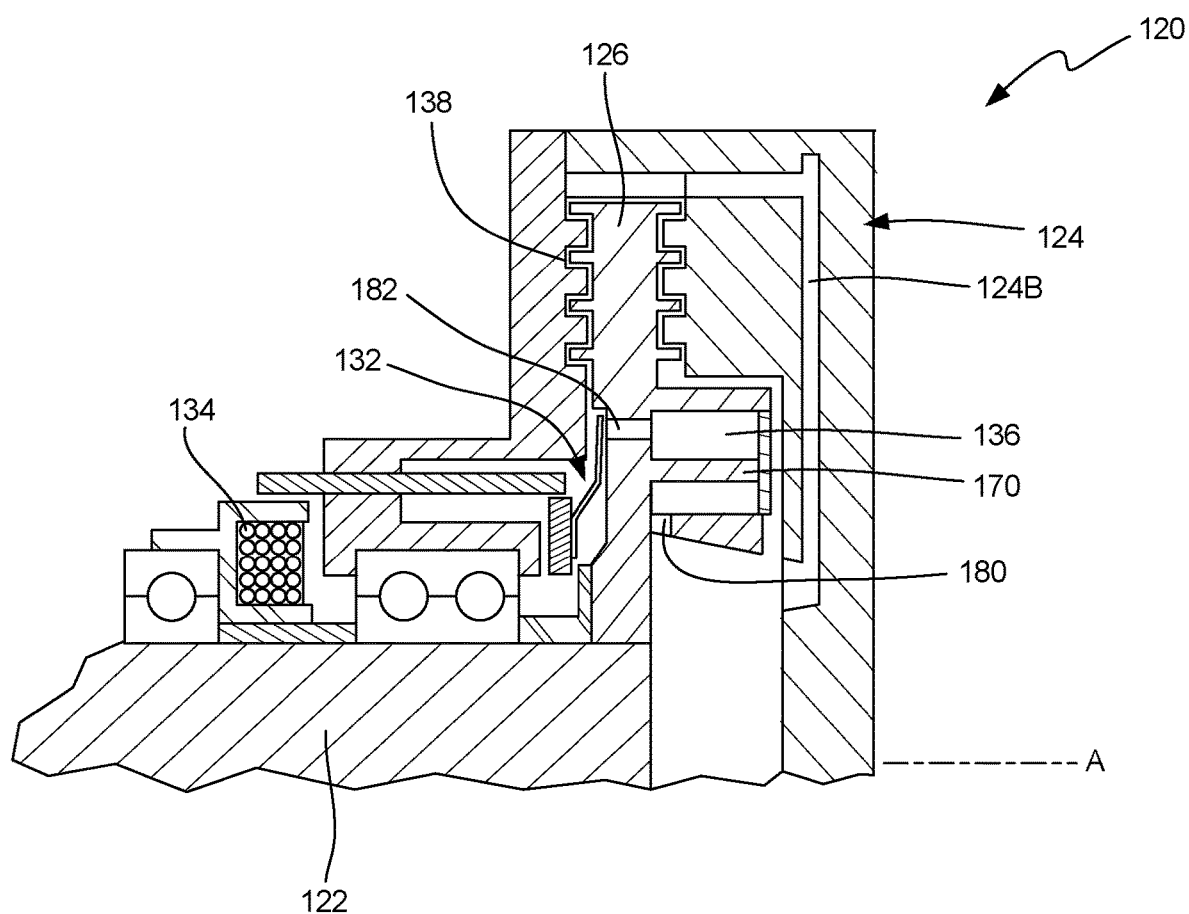
FIG. 3 is a cross-sectional view of another embodiment of a viscous clutch according to the present invention, shown only above a central axis.
Figure 4:
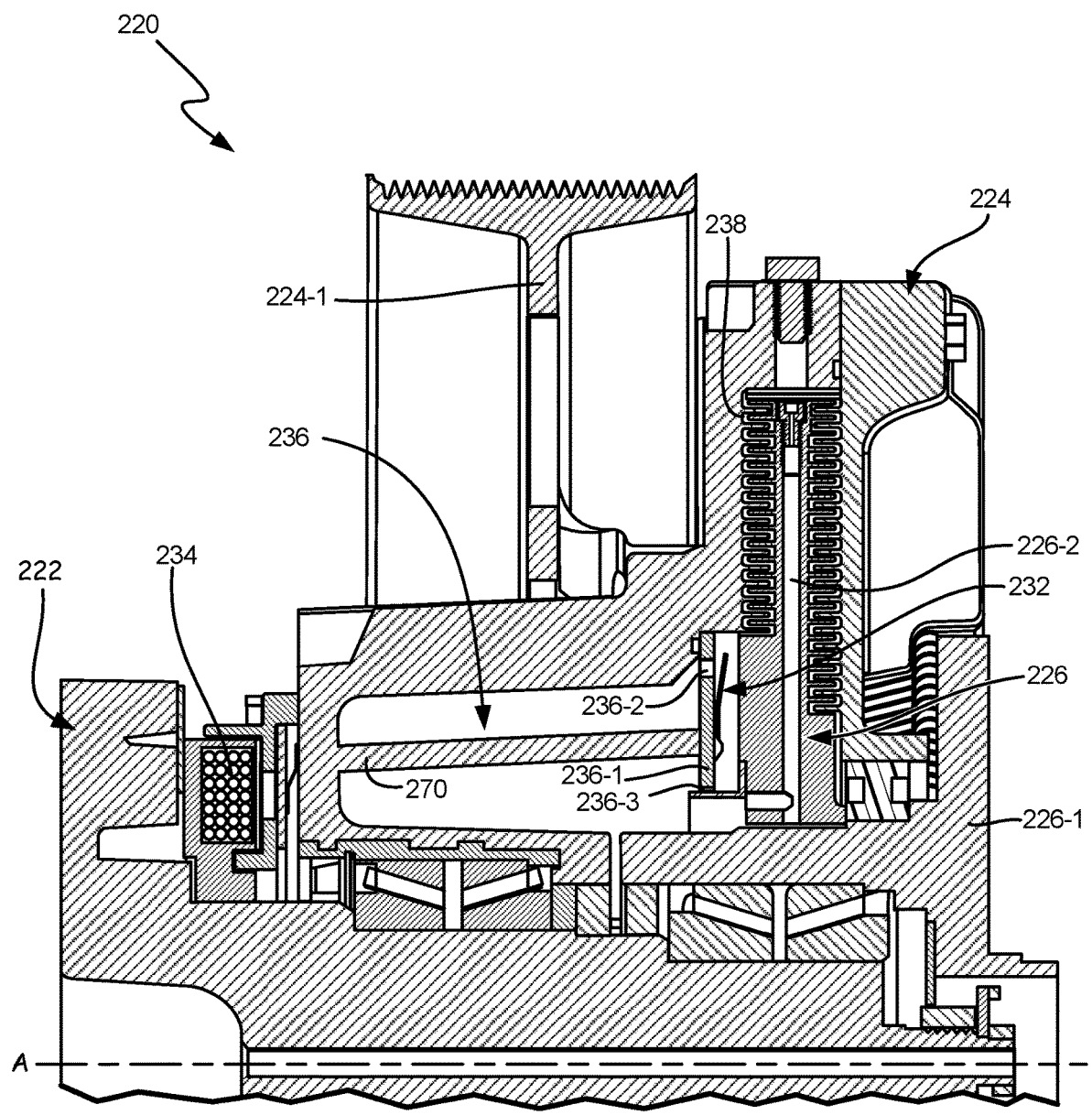
FIG. 4 is a cross-sectional view of another embodiment of a viscous clutch according to the present invention, shown only above a central axis.

The configuration of the clutch 20 of FIGS. 1 and 2 is provided merely by way of example and not limitation. Fluid capture systems to reduce morning sickness effects according to the present invention can be utilized in a variety of types of viscous clutches, such that those having different input and output configurations. FIGS. 3 and 4 illustrate selected examples of additional clutch configurations, though additional embodiments (not specifically shown) are also contemplated.

FIG. 3 is a cross-sectional view of another embodiment of a viscous clutch 120 that includes a shaft 122, a multi-part housing (or housing assembly) 124, a rotor 126, a valve assembly 132, an electromagnet 134, a reservoir 136, and a working chamber 138. The general operation of the clutch 120 is similar to the clutch 20 described above. However, in the illustrated embodiment, the rotor 126 is affixed to the shaft 122 and provides a rotational input member for the clutch 120. The housing 124 acts as an output member for the clutch 120. The reservoir 136 is carried by the rotor 126. While the illustrated embodiment has the reservoir 136 on a front side of the clutch 120 (opposite the electromagnet 134), in further embodiments the reservoir 136 can be located at a rear side of the rotor 126 or embedded in an axially middle portion of the rotor 126. A return bore 124B extends through the housing 124, and delivers the shear pumped from the working chamber to the reservoir 136 via an inlet bore 180. The shear fluid can exit the reservoir 136 and pass to the working chamber to complete a fluid circuit via an outlet bore 182, which is selectively covered and uncovered by the valve assembly 132. The reservoir can be closed except for the two bores 180 and 182. The clutch 120 omits the accumulator 72 of the clutch 20, although such an accumulator can be utilized with the clutch 120 in alternate embodiments.

A wall 170 is provided within the reservoir 136, to separate or divide portions of the reservoir 136 from each other (e.g., generally in the radial direction). Unlike the wall 70-1 of the clutch 20, however, the wall 170 creates an extended, tortuous reservoir path, such that the fluid circuit of the clutch 120 includes the tortuous reservoir path. In particular, the wall 170 is positioned in between the bores 180 and 182, such that the shear fluid cannot follow a linear path from the bore 180 to the bore 182. The shear fluid passing through the reservoir 136 must traverse the reservoir path, and the tortuous configuration of the reservoir path lengthens the fluid circuit by extending the fluid circuit (e.g., in a circumferential direction), which helps to capture and retain at least a portion of the shear fluid held in the reservoir 136 when the clutch 120 is in an idle condition. The shape of the wall 170 and the placement of the bores 180 and 182 helps ensure that a substantial amount of the shear fluid is captured in the reservoir 136 when the clutch 120 is shut down (i.e., "off" or in an idle condition) regardless of the angular orientation of the clutch components at rest. The tortuous reservoir path is explained further below (see, for example, the discussion with respect to FIG. 7). However, in alternate embodiments the sub-chamber 70 and/or the accumulator 72 of the clutch 20 can be utilized with the clutch 120 instead of the wall 170, for instance.

To further promote capture and retention of the shear fluid, bores 180 and 182 can be angularly offset from each other (i.e., in a circumferential direction) to help maintain independent fluid paths.

FIG. 4 is a cross-sectional view of another embodiment of a viscous clutch 220 that includes a shaft 222, a multi-part housing (or housing assembly) 224, a rotor 226, a valve assembly 232, an electromagnet 234, a reservoir 236, and a working chamber 238. The general operation of the clutch 220 is similar to the clutches 20 and 120 described above, and can resemble the clutch described in commonly-assigned U.S. Patent Application Publication No. 2015/0240888. However, in the illustrated embodiment, the clutch 220 utilizes a static (i.e., non-rotating) shaft 222. The housing 224 can function as an input member of the clutch 220, and the rotor 226 can function as an output member. The rotor 226 can include a hub 226-1 that protrudes out of the housing 224 to enable attachment of an output device, such as a fan (not shown). Furthermore, the housing 224 can include a pulley 224-1 to connect to a torque input source.

A return bore 226-2 is provided in the rotor 226, to deliver fluid pumped from the working chamber 238 along a fluid circuit toward the reservoir 236.

A reservoir plate 236-1 is provided and forms a portion of a boundary of the reservoir 236. An outlet bore 236-2 and an inlet bore 236-3 are provided through the plate 236-1. Although a gap at the inlet bore 236-3 means that the reservoir 236 is not closed, that is there is an additional opening from the reservoir 236, such a gap is relatively close to an axis A of the clutch 220, which tends to lessen morning sickness drainback. A seal (not shown) can be added at the gap in further embodiments, as desired, to provide a closed reservoir.

A wall 270 is provided within the reservoir 236, to separate or divide portions of the reservoir 236 from each other (e.g., generally in the radial direction). Like the wall 170, the wall 270 creates an extended, tortuous reservoir path, such that the fluid circuit of the clutch 220 includes the tortuous reservoir path. In particular, the wall 270 is positioned in between the bores 236-2 and 236-3, such that the shear fluid cannot follow a linear path from the inlet bore 236-2 to the outlet bore 236-3. The shear fluid passing through the reservoir 236 must traverse the reservoir path, and the tortuous configuration of the reservoir path lengthens the fluid circuit by extending or lengthening the fluid circuit (e.g., in a circumferential direction), which helps to capture and retain at least a portion of the shear fluid held in the reservoir 236 at one or more locations along the reservoir path when the clutch 220 is in an idle condition. The shape of the wall 270 and the placement of the bores 236-2 and 236-3 helps ensure that a substantial amount of the shear fluid is captured in the reservoir 236 when the clutch 220 is shut down (i.e., "off" or in an idle condition) regardless of the angular orientation of the clutch components at rest. The tortuous reservoir path is explained further below (see, for example, the discussion with respect to FIG. 7). However, in alternate embodiments the sub-chamber 70 and/or the accumulator 72 of the clutch 20 can be utilized with the clutch 220 instead of the wall 270, for instance.

FIGS. 5-11 are schematic views of different embodiments of a viscous fluid capture system for a viscous clutch. Retained shear fluid is shown in FIGS. 5-11 as stippling, for illustrative purposes. For simplicity, FIGS. 5-11 show only fluid capture system embodiments in isolation, without other components of the viscous clutch (as shown in FIGS. 1-4). It should be understood that the embodiments of the fluid capture system of FIGS. 5-11 can be implemented in a variety of overall viscous clutch designs, such as those resembling the example viscous clutches shown in FIGS. 1-4 or other types not specifically shown, and can be implemented on input or output members of a viscous clutch, as desired for particular applications.

Figure 5:
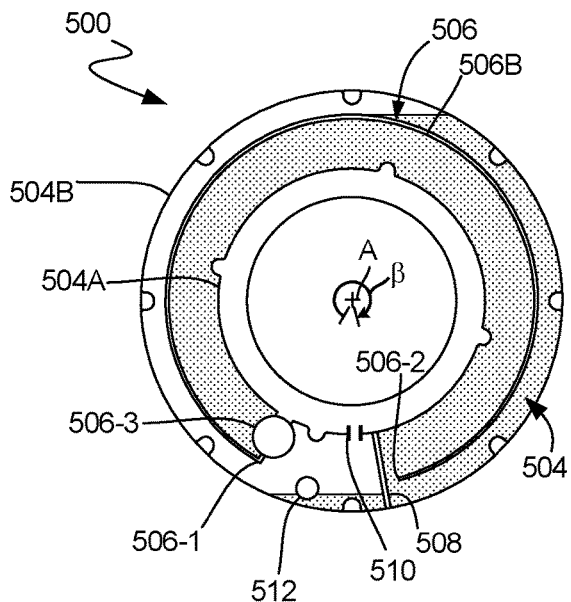
FIGS. 5-11 are schematic views of different embodiments of a viscous fluid capture system for a viscous clutch according the present invention.

FIG. 5 is a schematic view of an embodiment of a fluid capture system 500 for use with a viscous clutch. The system 500 includes an accumulator 502, a reservoir 504, walls 506 and 508, and bores 510 and 512.

The accumulator 502 can be a generally annular chamber that accepts a shear fluid from a working chamber via a return bore (not shown in FIG. 5). The accumulator 502 can have an open face as an inlet, or another type of inlet bore. The shear fluid can pass from the accumulator 502 to the reservoir 504 via the bore 510, which, in the illustrated embodiment, is oriented radially with the accumulator located radially inward of the reservoir 504. The bore 510 can be the only passageway between the accumulator 502 and the reservoir 504, such that only a single fluid path at a single location links the accumulator 502 and the reservoir 504 in series along a clutch fluid circuit.

The reservoir 504 has an inner boundary 504A and an outer boundary 504B, and includes a sub-chamber defined at least in part by the wall 506, which can extend axially across an entire dimension of the reservoir 504 to provide a fluid-tight barrier. The wall 506 has a main body (or segment) 506B and opposite ends 506-1 and 506-2, and can be at least partially arcuate in shape (e.g., the main body 506B can be arcuate), extending about an axis A of the clutch over an angular range β. In the illustrated embodiment, the angular range β is approximately 315°, though other angular ranges can be used in alternate embodiments. The main body 506B can be located in a radially intermediate or middle portion of the reservoir 504. A projection 506-3 extends radially inward from the main body 506B of the wall 506 at or near the end 506-1, and preferably at the end 506-1. The projection 506-3 extends to the inner boundary 504A of the reservoir 504, forming a "dead end" in the sub-chamber formed by the wall 506. The wall 508 extends radially across the entire reservoir 504, from the inner boundary 504A to the outer boundary 504B, and is positioned adjacent to the end 506-2 of the wall 506, separated from the end 506-2 by a gap. In the illustrated embodiment, the bore 510 is positioned in between the ends 506-1 and 506-2, and in between the projection 506-3 and the wall 508, in an angular or circumferential direction. An area of the reservoir 504 adjoining the bore 510 can be considered an inlet portion of the reservoir 504.

The bore 512 can be located adjacent to the bore 510. The bore 512 can be located in a reservoir plate, and can be oriented generally normal to the bore 510 (e.g., the bore 512 can extend substantially axially). The bore 512 provides an outlet from the reservoir 504, such that the shear fluid can pass out of the reservoir 504 toward the working chamber (not shown) to continue along the fluid circuit. In the illustrated embodiment, the bores 510 and 512 are located in a common angular quadrant of the reservoir 504 (relative to the axis A), and more specifically can be located within approximately 15° of each other. The bore 512 can further be located in between the projection 506-3 and the wall 508. The bores 510 and 512 can be the only inlets/outlets to an otherwise closed and sealed reservoir 504.

When a clutch having the system 500 is in an idle condition, the shear fluid that is in the reservoir 504 can potentially drain back to the working area through either of the bores 510 or 512. In a typical prior art clutch, if either bore is oriented downward, it is easy for most of the shear fluid to drain back from the reservoir to the working chamber. However, because the sub-chamber formed by the wall 506 and/or the wall 508 can capture and retain some of the shear fluid, the system 500 helps retain shear fluid in the reservoir 504 and limit how much shear fluid is able to drain back to the working chamber out of either bore 510 or 512 by way of gravity when the system 500 is at rest. The accumulator 502 can further help reduce drainback of the shear fluid to the working chamber.

As shown in FIG. 5, the shear fluid is retained within the reservoir 504 by the walls 506 and 508. In the illustrated orientation, the shear fluid is able to drain out of the accumulator 502 to the reservoir 504, but in other angular orientations a portion of the shear fluid would be retained in the accumulator 502 as well.

Figure 6:
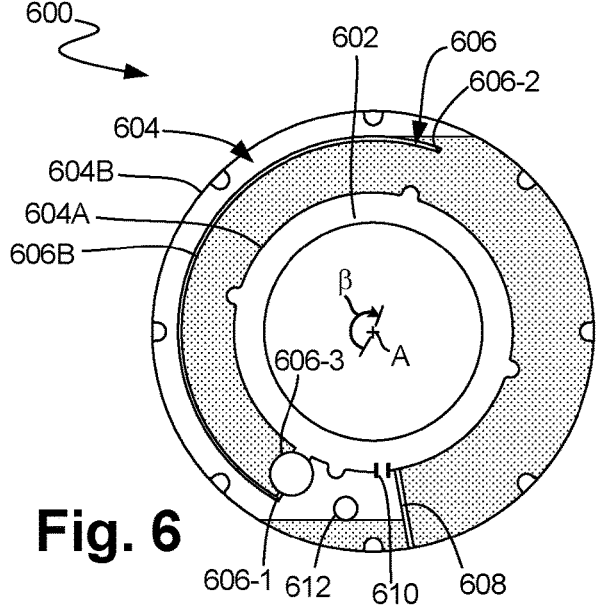

FIG. 6 is a schematic view of an embodiment of a fluid capture system 600 for use with a viscous clutch. The system 600 includes an accumulator 602, a reservoir 604, walls 606 and 608, and bores 610 and 612. The reservoir 604 has an inner boundary 604A and an outer boundary 604B, and includes a sub-chamber defined at least in part by the wall 606. The wall 606 has a main body (or segment) 606B and opposite ends 606-1 and 606-2, and can be at least partially arcuate in shape (e.g., the main body 606B can be arcuate), extending about an axis A of the clutch over an angular range β.

The configuration and operation of the system 600 is generally similar to the system 500 described with respect to FIG. 5; however, the angular range β of the wall 606 is approximately 170° and the bore 612 is located more radially inward than the bore 512. The embodiment of the system 600 provides a lower mass, due to a shorter wall 606, and a larger gap between the end 606-2 and the wall 608 to facilitate flow of the shear fluid. Although the wall 606 will retain less of the shear fluid than the wall 506 at some angular orientations, in the illustrated orientation the systems 500 and 600 capture and retain comparable volumes of the shear fluid, with the alternate location of the bore 612 providing a small increase in shear fluid retention in the system 600 over the system 500. A further trade-off between the embodiments of FIGS. 5 and 6, is that the more radially outward bore 512 can help increase clutch response time slightly, due to centrifugal forces acting on the shear fluid during operation.

Figure 7:
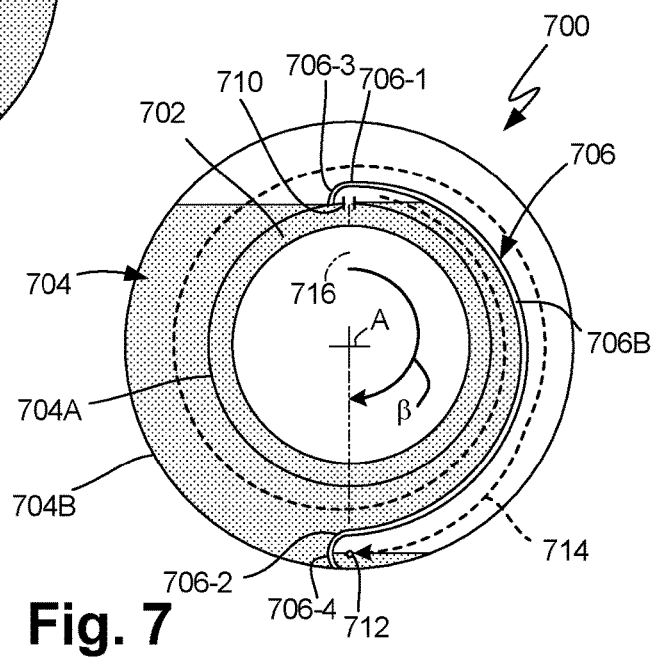

FIG. 7 is a schematic view of an embodiment of a fluid capture system 700 for use with a viscous clutch. The system 700 includes an accumulator 702, a reservoir 704, a wall 706, and bores 710 and 712. Unlike the embodiments of systems 500 and 600 that primarily seek to capture and retain a shear fluid away from a working chamber in a sub-compartment or sub-chamber that is peripheral to a clutch fluid circuit, the system 700 provides a tortuous reservoir path 714 that extends a length of a fluid circuit to help retain and capture the shear fluid away from the working chamber.

The accumulator 702 can be a generally annular chamber that accepts the shear fluid from the working chamber via a return bore (not shown in FIG. 7). The accumulator 702 can have an open face as an inlet, or another type of inlet bore. The shear fluid can pass from the accumulator 702 to the reservoir 704 via the bore 710, which, in the illustrated embodiment, is oriented radially with the accumulator 702 located radially inward of the reservoir 704. The bore 710 can be the only passageway between the accumulator 702 and the reservoir 704, such that only a single fluid path at a single location links the accumulator 702 and the reservoir 704 in series along the clutch fluid circuit. Additionally, the bores 710 and 712 can be the only inlets/outlets to an otherwise sealed reservoir 704.

The reservoir 704 has an inner boundary 704A and an outer boundary 704B. The bore 710 can be located at or near an inner diameter (ID) of the reservoir 704, such as at the inner boundary 704A, and the bore 712 can be located at or near an outer diameter (OD) of the reservoir 704, such as near but radially inward from the outer boundary 704B. The bore 712 can be located in a reservoir plate, and can be oriented generally normal to the bore 710 (e.g., the bore 712 can extend substantially axially). An area of the reservoir 704 adjoining the bore 710 can be considered an inlet portion of the reservoir 704. The bore 712 provides an outlet from the reservoir 704, such that the shear fluid can pass out of the reservoir 704 toward the working chamber (not shown) to continue along the fluid circuit. Because rotation of the reservoir 704 during operation tends to move the shear fluid to the OD of the reservoir 704 by centrifugal forces, the OD location of the bore 712 allows for relatively quick delivery of the shear fluid from the reservoir 704 to the working chamber when a clutch valve assembly is actuated. The bores 710 and 712 can be located at an angle α from one another, relative to the rotational axis A. The angle α can be approximately 180°, or a larger or smaller angle in alternative embodiments.

The reservoir 704 includes a fluid-tight barrier or dividing structure defined wholly or partially by the wall 706, which can extend axially across an entire dimension of the reservoir 704. The wall 706 has a main body (or segment) 706B and opposite ends 706-1 and 706-2, and can be at least partially arcuate in shape, extending about the axis A over an angular range β. The main body 706B can be located in a radially intermediate or middle portion of the reservoir 704, and can have a helically outward progression from the end 706-1 to the opposite end 706-2. In the illustrated embodiment, the angular range β is approximately 180°, though other angular ranges can be used in alternate embodiments. A projection (or end piece) 706-3 extends radially inward from the main body 706B of the wall 706 at or near the end 706-1, and preferably at the end 706-1, to the inner boundary 704A of the reservoir 704. A projection (or end piece) 706-4 extends radially outwardly from the main body 706B of the wall 706 at or near the end 706-2, to the outer boundary 704B of the reservoir 704. In this way, the projections 706-3 and 706-4 extend in opposite radial directions relative to the main body 706B of the wall 706. The projection 706-4 can have a convex shape in an angular or circumferential direction (e.g., with the convexity protruding away from the bore 712). In the illustrated embodiment, the bore 710 is positioned adjacent and proximate to the end 706-1 and the projection 706-3 of the wall 706, and the bore 712 is positioned adjacent and proximate to the end 706-2 and the projection 706-4 of the wall 706. The projections 706-3 and 706-4 can both be located to the same side of a projected line 716 that passes through centers of the bores 710 and 712. Described another way, the wall 706 can have a "C"-shape with serif-like projections 706-3 and 706-4 at either ends 706-1 and 706-2 that both protrude radially in the same direction (e.g., downward as illustrated in FIG. 7).

As shown in the illustrated embodiment of FIG. 7, a first portion of the reservoir 704 has a first "dead end" portion proximate the projection 706-3 and the bore 710 and radially inward from the wall 706, and a second portion of the reservoir 704 has a second "dead end" portion proximate the projection 706-4 and the bore 712 and radially outward from the wall 706. In this way, the dividing structure creates the tortuous (e.g., spiral or snail-shell) shaped reservoir path 714 between the bores 710 and 712. The reservoir path 714 can traverse or sweep over an angular range θ, about the axis A. In the illustrated embodiment, the angular range θ is approximately 540°. Furthermore, in the illustrated embodiment, θ≥3α. In alternate embodiments, the angular range θ can be larger or smaller, such as with θ≥360° or θ>180°. Furthermore, in some embodiments, θ≥α, and preferably θ>α, and more preferably θ>>α. During operation, the shear fluid is forced to travel along the reservoir path 714 through the entire angular range θ to go from the entrance/inlet (i.e., the bore 710) to the exit/outlet (i.e., the bore 712) and thereby pass through the reservoir 704 along the fluid circuit.

When a clutch having the system 700 is in an idle or "off" condition, the shear fluid in the reservoir 704 can potentially drain back to the working area through either of the bores 710 or 712. In a typical prior art clutch, if either bore is oriented downward, it is easy for most of the shear fluid to drain back from the reservoir to the working chamber. However, because the two bores 710 and 712 are located at the angle α (e.g., approximately) 180° from one another, and the reservoir path 714 traverses the angular range of θ, only one bore (710 or 712) can be oriented downward (i.e., located below a horizontal projected line that passes through the axis A) at any given time. Furthermore, the wall 706 helps retain shear fluid in the reservoir 704, and limit how much shear fluid is able to drain back to the working chamber out of either bore 710 or 712 by way of gravity when the system 700 is at rest. In the upstream-downstream direction, a middle portion of the reservoir path 714 has a radial dimension that extends from the inner boundary 704A to the outer boundary 704B, without any narrowing or obstruction by the wall 706, which allows a relatively large volume of the shear fluid to be captured and retained at the middle portion of the reservoir path 714 during idle conditions.

Figure 8:
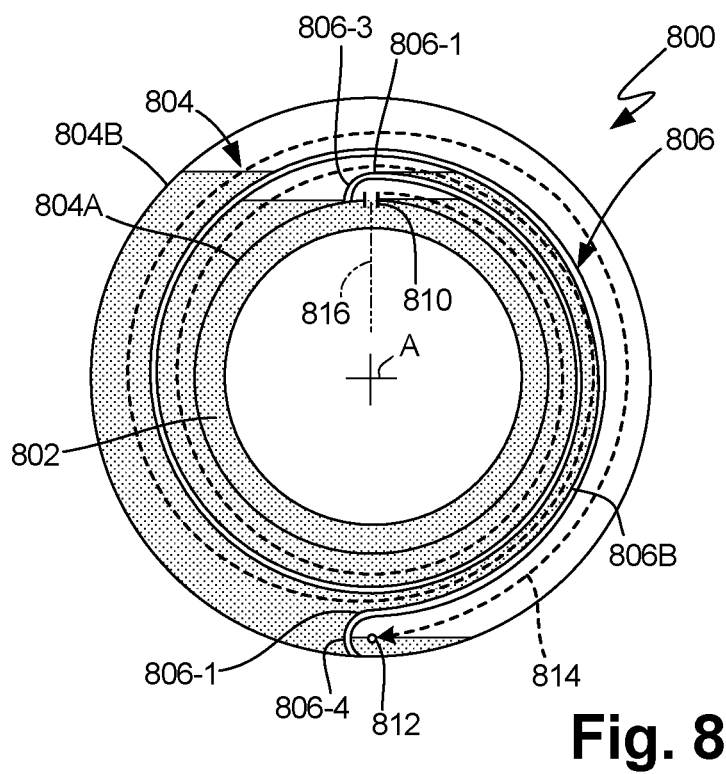

FIG. 8 is a schematic view of an embodiment of a fluid capture system 800 for use with a viscous clutch. The system 800 includes an accumulator 802, a reservoir 804, a wall 806, and bores 810 and 812. The reservoir 804 has an inner boundary 804A and an outer boundary 804B. The bores 810 and 812 can be located at an angle α from one another, relative to a rotational axis A. The wall 806 has a main body (or segment) 806B and opposite ends 806-1 and 806-2, and can be at least partially arcuate in shape, extending about the axis A over an angular range β. In the illustrated embodiment, the main body 806B has a spiral or helical shape, progressing helically outward from the end 806-1 to the opposite end 806-2. A projection 806-3 extends radially inward from the main body 806B of the wall 806 at or near the end 806-1, and preferably at the end 806-1, to the inner boundary 804A of the reservoir 804. A projection 806-4 extends radially outwardly from the main body 806B of the wall 806 at or near the end 806-2, to the outer boundary 804B of the reservoir 804. The projections 806-3 and 806-4 can be located on the same side of a projected line 816 connecting centers of the bores 810 and 812. A reservoir path 814 from the bore 810 to the bore 812 can traverse or sweep over an angular range θ, about the axis A.

The system 800 has a configuration generally similar to the system 700, with the wall 806 providing the tortuous reservoir path 814 that extends a length of a fluid circuit to help retain and capture the shear fluid away from a working chamber. However, the wall 806 is longer than the wall 706, such that the wall 806 wraps around the axis A more than once and overlaps itself in the angular or circumferential direction. More particularly, in the illustrated embodiment, the angular range θ is approximately 540°. Similar to the system 700, during operation of the system 800, the shear fluid is forced to travel along the reservoir path 814 through the entire angular range θ to go from the entrance/inlet (i.e., the bore 810) to the exit/outlet (i.e., the bore 812) and thereby pass through the reservoir 804 along the fluid circuit. Because the bores 810 and 812 are located at the angle α (e.g., approximately 180°) from one another, and the reservoir path 814 traverses the angular range of θ (e.g., with θ>α), only one bore (810 or 812) can be oriented downward (i.e., located below a horizontal projected line that passes through the axis A) at any given time. Furthermore, the wall 806 helps retain shear fluid in the reservoir 804, and limit how much shear fluid is able to drain back to the working chamber out of either bore 810 or 812 by way of gravity when the system 800 is at rest.

Figure 9:
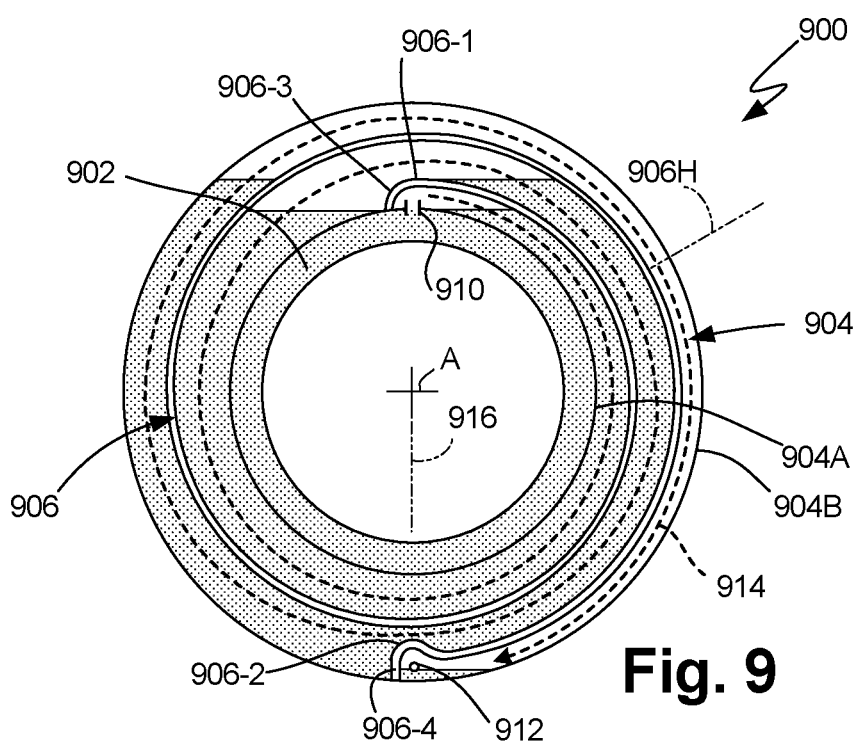

FIG. 9 is a schematic view of an embodiment of a fluid capture system 900 for use with a viscous clutch. The system 900 includes an accumulator 902, a reservoir 904, a wall 906, and bores 910 and 912. The reservoir 904 has an inner boundary 904A and an outer boundary 904B. The bores 910 and 912 can be located at an angle α (e.g., approximately) 180° from one another, relative to a rotational axis A. The wall 906 has a main body (or segment) 906B and opposite ends 906-1 and 906-2, and can be at least partially arcuate in shape, extending about the axis A over an angular range β. In the illustrated embodiment, the main body 906B has a partially spiral or helical shape, with an upstream portion (closest to the end 906-1) progressing helically outward from the end 906-1 toward the opposite end 906-2, and with a downstream portion (closest to the end 906-2) configured as a non-helical, circular arc segment. The helical portion of the main body 906B meets the circular portion of the main body 906B at a point 906H. A projection 906-3 extends radially inward from the main body 906B of the wall 906 at or near the end 906-1, and preferably at the end 906-1, to the inner boundary 904A of the reservoir 904. A projection 906-4 extends radially outwardly from the main body 906B of the wall 906 at or near the end 906-2, to the outer boundary 904B of the reservoir 904. The projections 906-3 and 906-4 can be located on the same side of a projected line 916 connecting centers of the bores 910 and 912. In the illustrated embodiment, the projection 906-4 includes a substantially planar portion joined to the arcuate main body 906B by a radiused, convex corner that protrudes radially inward from the adjacent region of the main body 906B. The inwardly protruding shape of the radiused corner can help to further capture and retain the shear fluid at particular angular orientations of the system 900, by discouraging the shear fluid from easily flowing past the protrusion along an inner side of the wall 906. A reservoir path 914 from the bore 910 to the bore 912 can traverse or sweep over an angular range θ (e.g., approximately 540°), about the axis A.

The system 900 has a configuration generally similar to the systems 700 and 800, with the wall 906 providing the tortuous reservoir path 914 that extends a length of a fluid circuit to help retain and capture the shear fluid away from a working chamber. However, unlike the helical main body 806B of the system 800, the main body 906B of the wall 906 is only partially helical, with an upstream helical portion and a downstream circular (non-helical) portion. A varying cross-sectional area of the reservoir path 914 created by the helical/non-helical shape of the main body 906B of the wall 906 helps to tailor shear fluid capture and retention functionality. For instance, a cross-sectional are and volume of portions of the reservoir 904 can be larger at a middle portion of the reservoir path 914 than at both an upstream end and a downstream end of the reservoir path 914. Moreover, the helical/non-helical shape more aggressively forces the shear fluid toward the outside of the reservoir 904 during rotation. This will help the shear fluid move from the ID to the OD quicker, to help improve clutch response times. Similar to the systems 700 and 800, during operation of the system 900, the shear fluid is forced to travel along the reservoir path 914 through the entire angular range θ to go from the entrance/inlet (i.e., the bore 910) to the exit/outlet (i.e., the bore 912) and thereby pass through the reservoir 904 along the fluid circuit. Because the bores 910 and 912 are located at the angle α (e.g., approximately 180°) from one another, and the reservoir path 914 traverses the angular range θ (e.g., with θ>α), only one bore (910 or 912) can be oriented downward (i.e., located below a horizontal projected line that passes through the axis A) at any given time. Furthermore, the wall 906 helps retain shear fluid in the reservoir 904, and limit how much shear fluid is able to drain back to the working chamber out of either bore 910 or 912 by way of gravity when the system 900 is at rest.

Figure 10:
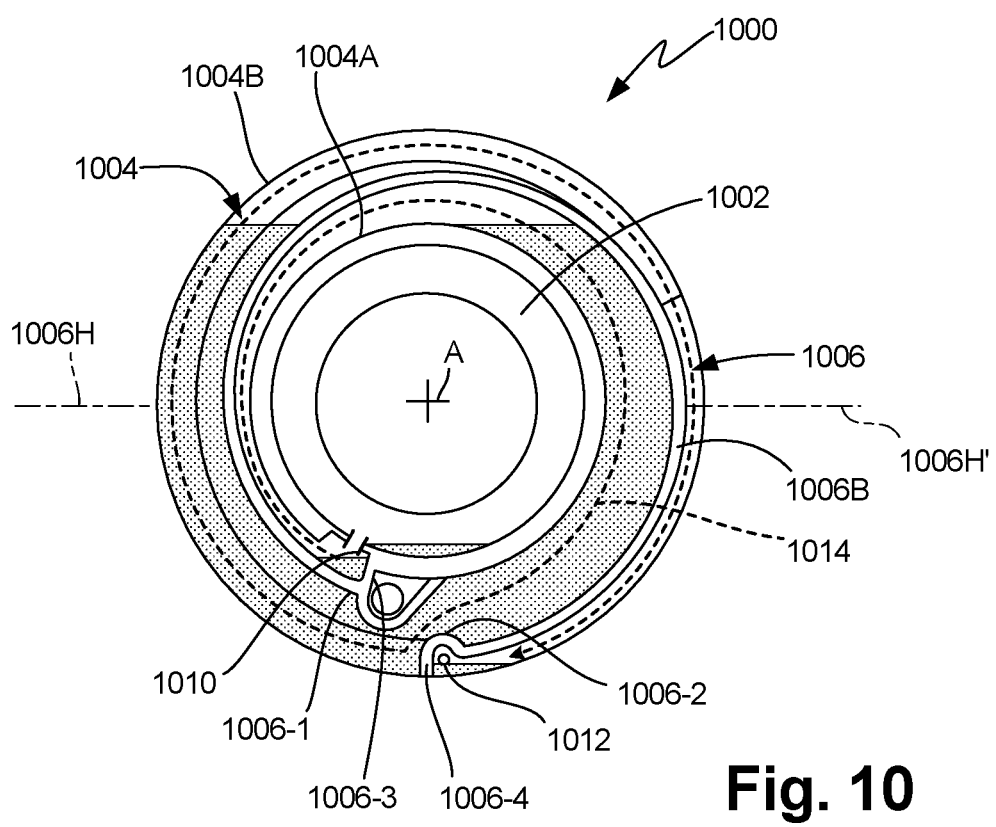

FIG. 10 is a schematic view of an embodiment of a fluid capture system 1000 for use with a viscous clutch. The system 1000 includes an accumulator 1002, a reservoir 1004, a wall 1006, and bores 1010 and 1012. The reservoir 1004 has an inner boundary 1004A and an outer boundary 1004B, and can optionally include one or more portions with an increased axial depth. The bores 1010 and 1012 can be located at an angle α from one another, relative to a rotational axis A. The angle α can be relatively small, such as less than 90°, less than 45°, or preferably approximately 30°. The wall 1006 has a main body (or segment) 1006B and opposite ends 1006-1 and 1006-2, and can be at least partially arcuate in shape, extending about the axis A over an angular range β. A reservoir path 1014 from the bore 1010 to the bore 1012 can traverse or sweep over an angular range θ (e.g., approximately 330°), about the axis A.

In the illustrated embodiment, the main body 1006B has a partially spiral or helical shape, with an upstream portion (closest to the end 1006-1) and a downstream portion (closest to the end 1006-2) being circular (i.e., non-helical), with a middle portion of the main body 1006B progressing helically outward from a first point 1006H to a second point 1006H' along the main body 1006B. Such a configuration allows upstream and downstream portions of the reservoir 1004 (along the reservoir path 1014) to have relatively small volumes, while a middle portion of the reservoir 1004 (along the reservoir path 1014) can have a relatively large volume to help retain the shear fluid under idle conditions. In this respect, the upstream portion of the main body 1006B (near the end 1006-1) is relatively close to the inner boundary 1004A and the upstream portion of the main body 1006B (near the end 1006-2) is relatively close to the outer boundary 1004B.

A projection 1006-3 extends radially inward from the main body 1006B of the wall 1006 at or near the end 1006-1, and preferably at the end 1006-1, to the inner boundary 1004A of the reservoir 1004. A projection 1006-4 extends radially outwardly from the main body 1006B of the wall 1006 at or near the end 1006-2, to the outer boundary 1004B of the reservoir 1004. In the illustrated embodiment, the projection 1006-4 includes a substantially planar portion joined to the arcuate main body 1006B by a radiused, convex corner that protrudes radially inward from the adjacent region of the main body 1006B. Further, as shown in the illustrated embodiment, a generally radial notch or groove can be provided at the bore 1010, in a common wall separating the accumulator 1002 from the reservoir 1004, to help increase a volume of an inlet portion of the reservoir 1004 and to move the bore 1010 further from regions of the reservoir 1004 where the shear fluid is retained when the clutch is in the idle condition.

The system 1000 has a configuration generally similar to the systems 700, 800 and 900, with the wall 1006 providing the tortuous reservoir path 1014 that extends a length of a fluid circuit to help retain and capture the shear fluid away from a working chamber. Likewise, similar to the systems 700, 800 and 900, during operation of the system 1000, the shear fluid is forced to travel along the reservoir path 1014 through the entire angular range θ to go from the entrance/inlet (i.e., the bore 1010) to the exit/outlet (i.e., the bore 1012) and thereby pass through the reservoir 1004 along the fluid circuit. However, the angular range θ for the system 1000 is larger, approaching 360°. Although it is possible for both of the bores 1010 and 1012 to be oriented downward (i.e., located below a horizontal projected line that passes through the axis A) under some idle conditions, the likelihood of shear fluid drainback is offset by the relatively longer reservoir path 1014. As with the previously-discussed embodiments, the wall 1006 helps retain shear fluid in the reservoir 1004, and limit how much shear fluid is able to drain back to the working chamber out of either bore 1010 or 1012 by way of gravity when the system 1000 is at rest.

Figure 11:
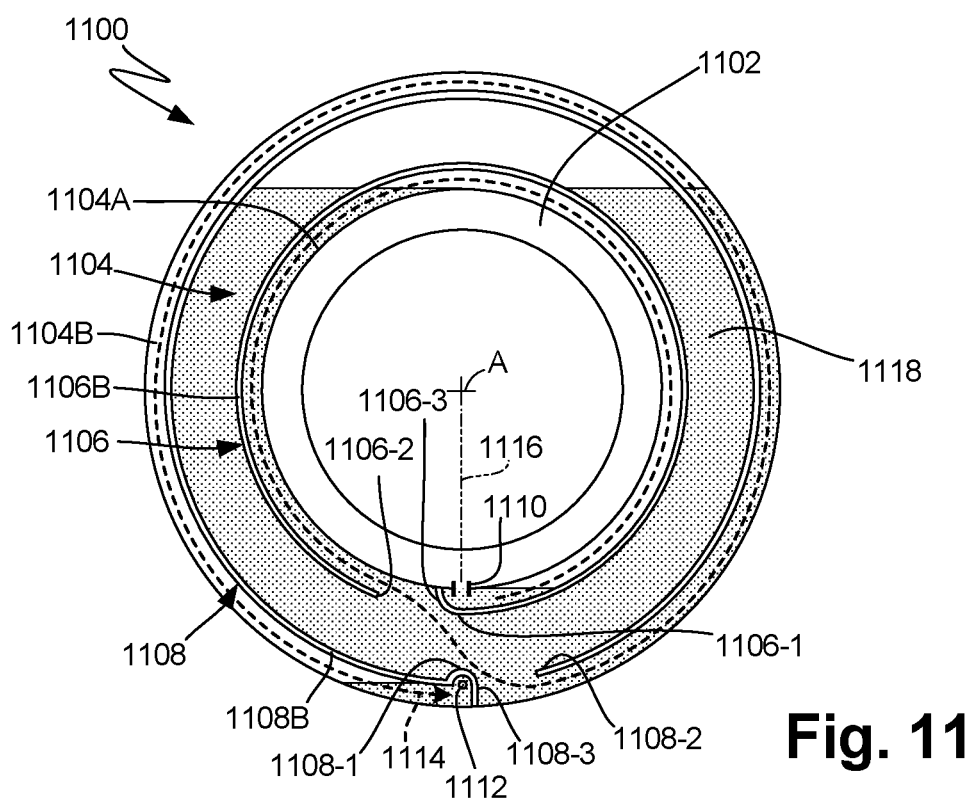

FIG. 11 is a schematic view of an embodiment of a fluid capture system 1100 for use with a viscous clutch. The system 1100 includes an accumulator 1102, a reservoir 1104, walls 1106 and 1108, and bores 1110 and 1112. Unlike the embodiments of systems 500 and 600 that primarily seek to capture and retain a shear fluid away from a working chamber in a sub-compartment or sub-chamber that is peripheral to a clutch fluid circuit, the system 1100 provides a tortuous reservoir path 1114 that extends a length of a fluid circuit to help retain and capture the shear fluid away from the working chamber.

The accumulator 1102 can be a generally annular chamber that accepts the shear fluid from the working chamber via a return bore (not shown in FIG. 11). The accumulator 1102 can have an open face as an inlet, or another type of inlet bore. The shear fluid can pass from the accumulator 1102 to the reservoir 1104 via the bore 1110, which, in the illustrated embodiment, is oriented radially with the accumulator 1102 located radially inward of the reservoir 1104. The bore 1110 can be the only passageway between the accumulator 1102 and the reservoir 1104, such that only a single fluid path at a single location links the accumulator 1102 and the reservoir 1104 in series along the clutch fluid circuit. Additionally, the bores 1110 and 1112 can be the only inlets/outlets to an otherwise closed and sealed reservoir 1104.

The reservoir 1104 has an inner boundary 1104A and an outer boundary 1104B. The bore 1110 can be located at or near the ID of the reservoir 1104, such as at the inner boundary 1104A, and the bore 1112 can be located at or near an OD of the reservoir 1104, such as near but radially inward from the outer boundary 1104B. The bore 1112 can be located in a reservoir plate, and can be oriented generally normal to the bore 1110 (e.g., the bore 1112 can extend substantially axially). An area of the reservoir 1104 adjoining the bore 1110 can be considered an inlet portion of the reservoir 704. The bore 1112 provides an outlet from the reservoir 1104, such that the shear fluid can pass out of the reservoir 1104 toward the working chamber (not shown) to continue along the fluid circuit. Because rotation of the reservoir 1104 during operation tends to move the shear fluid to the OD of the reservoir 1104 by centrifugal forces, the OD location of the bore 1112 allows for relatively quick delivery of the shear fluid from the reservoir 1104 to the working chamber when a clutch valve assembly is actuated. The bores 1110 and 1112 can be located at an angle $\alpha$ relative to one another, with respect to the rotational axis A. The angle $\alpha$ can be approximately 0°, meaning that the bores 1110 and 112 are substantially aligned at a common angular (or circumferential) location, or can be a larger angle in alternative embodiments.

The reservoir 1104 includes a dividing structure defined by the walls 1106 and 1108, which can each extend axially across an entire dimension of the reservoir 1104 to create respective fluid-tight barriers. The wall 1106 has a main body (or segment) 1106B and opposite ends 1106-1 and 1106-2, and can be at least partially arcuate in shape, extending about the axis A over an angular range $\beta_1$. The wall 1108 has a main body (or segment) 1108B and opposite ends 1108-1 and 1108-2, and can be at least partially arcuate in shape, extending about the axis A over an angular range $\beta_2$. The angular ranges $\beta_1$ and $\beta_2$ can each be relatively large, such as being greater than or equal to 180°, greater than or equal to 270°, greater than or equal to 330°, or approaching 360°. In the illustrated embodiment, the angular range $\beta_1$ is approximately 330° and the angular range $\beta_2$ is approximately 340°, though other angular ranges can be used for either angular range in alternate embodiments.

The main bodies 1106B and 1108B can each be located in a radially intermediate or middle portion of the reservoir 1104. In the illustrated embodiment, the main body 1106B of the wall 1106 is located radially inward of the main body 1108B of the wall 1108. Moreover, as shown in the illustrated embodiment, the wall 1106 can be positioned (radially) closer to the inner boundary 1104A of the reservoir 1104 than to the wall 1108, and the wall 1108 can be positioned (radially) closer to the outer boundary 1104B of the reservoir 1104 than to the wall 1106.

A projection (or end piece) 1106-3 extends radially inward from the main body 1106B of the wall 1106 at or near the end 1106-1, and preferably at the end 1106-1, to the inner boundary 1104A of the reservoir 1104. The end 1106-2 can be configured as a free end, which terminates in a radially middle portion of the reservoir 1104, spaced from the inner and outer boundaries 1104A and 1104B. In the illustrated embodiment, the bore 1110 is positioned adjacent and proximate to the end 1106-1 and the projection 1106-3 of the wall 1106.

A projection (or end piece) 1108-3 extends radially outward from the main body 1108B of the wall 1108 at or near the end 1108-1, and preferably at the end 1108-1, to the outer boundary 1104B of the reservoir 1104. The end 1108-2 can be configured as a free end, which terminates in a radially middle portion of the reservoir 1104, spaced from the inner and outer boundaries 1104A and 1104B. In the illustrated embodiment, the bore 1112 is positioned adjacent and proximate to the end 1108-1 and the projection 1108-3 of the wall 1108.

The projections 1106-3 and 1108-3 can be located on opposite sides of a projected line 1116 that passes through the centers of the bores 1110 and 1112. The free ends 1106-2 and 11-8-2 can also be located on opposite sides of the projected line 1116. Furthermore, the projection 1106-3 and the free end 1106-2 can be located on the same side of the projected line 1116, and the projection 1108-3 and the free end 1108-2 can be located on the same side of the projected line 1116 (e.g., a common circumferential location of the bores 1110 and 1112).

As shown in the illustrated embodiment of FIG. 11, one portion of the reservoir 1104 has a "dead end" portion proximate the projection 1106-3 and the bore 1110, radially inward from the wall 1106, and another portion of the reservoir 1104 has another "dead end" portion proximate the projection 1108-3 and the bore 1112, radially outward from the wall 1108. A middle portion 1118 is located radially in between the walls 1106 and 1108, and separated from the bores 1110 and 1112 by the walls 1106 and 1108 (and the associated dead-end portions). In this way, the dividing structure of the system 1100 creates the tortuous shaped reservoir path 1114 between the bores 1110 and 1112. The reservoir path 1114 can traverse or sweep over a minimum angular range $\theta$, about the axis A. In the illustrated embodiment, the angular range $\theta$ is approximately 720°. Furthermore, in the illustrated embodiment, $\theta \geq (\beta_1 + \beta_2)$. In alternate embodiments, the angular range $\theta$ can be larger or smaller. During operation, the shear fluid is forced to travel along the reservoir path 1114 through the entire minimum angular range $\theta$ to go from the entrance/inlet (i.e., the bore 1110) to the exit/outlet (i.e., the bore 1112) and thereby pass through the reservoir 1104 along the fluid circuit. At least part of the middle portion 1118 is unobstructed in a circumferential direction. Because the middle portion 1118 allows the shear fluid to flow generally radially past the free ends 1106-2 and 1108-2, but also allows the shear fluid to continue to flow tangentially or circumferentially around the middle portion 1118, the reservoir path 1114 has only a minimum angular range $\theta$, and the shear fluid can circulate further in the middle portion over a larger angular range (which can be expressed as $\theta + n*360$, wherein n is a non-negative integer).

As with previously-described embodiments, the system 1100 allows for the tortuous reservoir path 1114 to facilitate capture and retention of the shear fluid in an idle condition, facilitated by the walls 1106 and 1108.

The various embodiments of the present invention provide numerous advantages and benefits. For instance, shear fluid retention and capture can be provided passively, without the need for any moving elements (such as valves), pumping of the shear fluid within the reservoir or between the accumulator and the reservoir, or other active or quasi-active mechanisms. Various embodiments of the invention can utilize an accumulator in addition to structures within a reservoir. The dividing structure(s) within the reservoir according to embodiments of the present invention also do not require a radial or axial enlargement of the reservoir, which helps maintain a compact clutch design. The use of multiple features for shear fluid capture and retention has been found to provide benefits in terms of reduced morning sickness drainback effects, without having a significant negative impact on clutch performance when a torque input is present. In other words, while the use of morning-sickness reduction/prevention features, and especially multiple morning sickness features, presents a risk of adverse impacts upon clutch engagement and/or disengagement response times, clutch axial and/or radial size, manufacturing and assembly complexity, overall clutch mass, and other aspects, the present invention allows for a favorable trade-off between those considerations. The clutch and fluid capture system of the present invention provides a favorable tradeoff between clutch size and mass, manufacturability, and "morning sickness" mitigation. Other morning sickness prevention mechanisms require stacked or nested chambers that complicate clutch manufacture and tend to increase clutch size and mass, especially in an axial direction. While a degree of oil capture/retention according to embodiments of the present invention still varies depending on orientation of clutch in an idle state, retention of more than 45% of a total shear fluid volume has been found across all idle angular orientations, with over 85% shear fluid retention in some angular orientations for some embodiments and median fluid retention of roughly 65% across all angular orientations for most embodiments.

Discussion of Possible Embodiments

The following are non-exclusive descriptions of possible embodiments of the present invention.

A viscous clutch can include an input member; an output member; a working chamber defined between the input member and the output member; a reservoir to hold a supply of a shear fluid, the reservoir fluidically connected to the working chamber by a fluid circuit; an outlet to pass the shear fluid from the reservoir to the working chamber along the fluid circuit; a return bore to return the shear fluid pumped out of the working chamber along the fluid circuit; an accumulator to accept the shear fluid from the return bore, wherein the accumulator is arranged in series with the reservoir in the fluid circuit; and a first wall having an arcuate segment, the first wall positioned within the reservoir to separate a first portion of the reservoir from a second portion of the reservoir.

The viscous clutch of the preceding paragraph can optionally include, additionally and/or alternatively, any one or more of the following features, configurations and/or additional components:

the reservoir can be carried by the input member;

the input member can comprise a housing, and the output member can comprise a rotor disk;

the accumulator can have an axially open face;

a radial wall extending across an entire radial dimension of the reservoir from an inner boundary to an outer boundary, the radial wall being spaced from the first wall and configured to prevent circumferential movement of the shear fluid across a circumferential location of the radial wall;

the accumulator can be located upstream of the reservoir, between the return bore and the reservoir, in the fluid circuit of the viscous clutch;

the accumulator can be located radially inward of the reservoir;

the accumulator can be configured as an annular chamber;

the accumulator can be configured to allow the shear fluid to flow freely through an entire circumferential volume;

a reservoir plate positioned along a boundary of the reservoir, the reservoir plate extending radially, wherein the outlet is configured as a bore in the reservoir plate configured to allow the shear fluid to pass from the reservoir to the working chamber along the fluid circuit;

a separating wall between the accumulator and the reservoir;

an intermediate bore in the separating wall to allow the shear fluid to pass from the accumulator to the reservoir along the fluid circuit, wherein the intermediate bore is oriented normal to the bore of the outlet in the reservoir plate;

an intermediate bore connecting the accumulator to the reservoir along the fluid circuit, wherein the outlet is configured as a bore in a boundary of the reservoir, and wherein the intermediate bore is oriented normal to the bore of the outlet.

a valve assembly configured to regulate flow of the shear fluid along the fluid circuit;

the arcuate segment of the first wall can extend about an angular range $\beta$ with respect to an axis of the viscous clutch, the angular range $\beta$ being greater than 180°;

the arcuate segment of the first wall can extend about an angular range $\beta$ with respect to an axis of the viscous clutch, the angular range $\beta$ being greater than 360°;

the reservoir can be configured with an inlet portion circumferentially spaced from an outlet bore by approximately 180°;

the fluid circuit can include a reservoir path that traverses an angular range of at least 540°;

the first wall can further include a first end projection that radially connects the arcuate segment to a first circumferentially-extending boundary of the reservoir;

the first wall further can further include a second end projection that radially connects the arcuate segment to a second circumferentially-extending boundary of the reservoir, and the second end projection can be located opposite the first end projection along the arcuate segment;

a second wall can have an arcuate segment, and the second wall can be positioned within the reservoir radially adjacent to the first wall to separate a third portion of the reservoir from the first and second portions of the reservoir;

the reservoir can have a first bore and a second bore, the first bore providing an inlet to the reservoir along the fluid circuit and the second bore providing the outlet from the reservoir along the fluid circuit, and wherein the first and second bores are aligned at a common circumferential location;

the first and second walls can each have a free end, and the free ends can be arranged on opposite sides of the common circumferential location;

at least a portion of the arcuate segment of the first wall can have a helical shape;

the arcuate segment of the first wall can have a circular portion at a downstream end proximate an outlet bore of the reservoir, and a helically-shaped portion of the arcuate segment can be located upstream of the circular portion;

the fluid circuit can include a reservoir path through the reservoir, and wherein a cross-sectional area of the reservoir varies along the reservoir path;

a cross-sectional area of the reservoir can be larger at a middle portion of the reservoir path than at both an upstream end and a downstream end of the reservoir path;

the accumulator and the reservoir can be arranged at a common axial location; and/or at least a portion of the return bore can extend radially.

A method for use with a viscous clutch can include pumping a shear fluid radially inward from a working chamber to an accumulator; passing the shear fluid from the accumulator to a reservoir having a closed configuration; separating a first portion of the reservoir from a second portion of the reservoir with a first arcuate wall located within the reservoir; delivering the shear fluid from the reservoir to the working chamber; and bringing the viscous clutch to rest in an idle condition, wherein portions of the shear fluid are retained in both the accumulator and the first portion of the reservoir in the idle condition to reduce drain back from the reservoir to the working chamber.

The method of the preceding paragraph can optionally include, additionally and/or alternatively, any one or more of the following features, configurations and/or additional steps:

the shear fluid can pass from the accumulator to the reservoir in a radial direction at a single circumferential location.

A method for use with a viscous clutch can include pumping a shear fluid radially inward from a working chamber to an accumulator; passing the shear fluid from the accumulator to a reservoir having a closed configuration; moving all of the shear fluid from the accumulator along a reservoir path having a tortuous shape that traverses an angular range of at least 540° relative to an axis of the clutch; delivering the shear fluid from the reservoir to the working chamber; and bringing the viscous clutch to rest in an idle condition, wherein portions of the shear fluid are retained in both the accumulator and an upstream portion of the reservoir path in the idle condition to reduce drain back from the reservoir to the working chamber.

The method of the preceding paragraph can optionally include, additionally and/or alternatively, any one or more of the following features, configurations and/or additional steps:

the shear fluid can pass from the accumulator to the reservoir in a radial direction at a single circumferential location.

A viscous clutch can include an input member; an output member; a working chamber defined between the input member and the output member; a reservoir to hold a supply of a shear fluid, the reservoir fluidically connected to the working chamber by a fluid circuit; an outlet to pass the shear fluid from the reservoir to the working chamber along the fluid circuit; a return bore to return the shear fluid pumped out of the working chamber along the fluid circuit; a first wall having an arcuate segment, the first wall positioned within the reservoir to separate a first portion of the reservoir from a second portion of the reservoir; and a second wall having an arcuate segment, the second wall positioned within the reservoir radially adjacent to the first wall to separate a third portion of the reservoir from the first and second portions of the reservoir.

The viscous clutch of the preceding paragraph can optionally include, additionally and/or alternatively, any one or more of the following features, configurations and/or additional components:

the reservoir can have an inlet bore providing an inlet to the reservoir along the fluid circuit, and wherein the inlet bore and the outlet bore are aligned at a common circumferential location.

A viscous clutch can include an input member; an output member; a working chamber defined between the input member and the output member; a reservoir to hold a supply of a shear fluid, the reservoir fluidically connected to the working chamber by a fluid circuit; an outlet to pass the shear fluid from the reservoir to the working chamber along the fluid circuit; a return bore to return the shear fluid pumped out of the working chamber along the fluid circuit; and a first wall having an arcuate segment, a first end projection that radially connects the arcuate segment to a first circumferentially-extending boundary of the reservoir, and a second end projection that radially connects the arcuate segment to a second circumferentially-extending boundary of the reservoir, wherein the second end projection is located opposite the first end projection along the arcuate segment, and wherein the first wall is positioned within the reservoir to separate a first portion of the reservoir from a second portion of the reservoir.

The viscous clutch of the preceding paragraph can optionally include, additionally and/or alternatively, any one or more of the following features, configurations and/or additional components:

the first circumferentially-extending boundary of the reservoir can be an outer boundary, and the second circumferentially-extending boundary of the reservoir can be an inner boundary;

the arcuate segment of the first wall can extend about an angular range $\beta$ with respect to an axis of the viscous clutch, the angular range $\beta$ being greater than or equal to 540°;

the first end projection can include a substantially planar portion joined to the arcuate segment by a radiused corner that protrudes radially inward from the arcuate segment;

the first end projection can have a convex shape in a circumferential direction;

at least a portion of the arcuate segment of the first wall can have a helical shape;

the arcuate segment of the first wall can have a circular portion at a downstream end proximate an outlet bore of the reservoir, and a helically-shaped portion of the arcuate segment can be located upstream of the circular portion;

the fluid circuit can include a reservoir path through the reservoir, and a cross-sectional area of the reservoir can vary along the reservoir path; and/or a cross-sectional area of the reservoir is larger at a middle portion of a reservoir path through the reservoir than at both an upstream end and a downstream end of the reservoir path.

A viscous clutch can include an input member; an output member; a working chamber defined between the input member and the output member; a reservoir to hold a supply of a shear fluid, the reservoir fluidically connected to the working chamber by a fluid circuit; an outlet bore to pass the shear fluid from the reservoir to the working chamber along the fluid circuit; a return bore to return the shear fluid pumped out of the working chamber along the fluid circuit; a first wall having an arcuate segment, wherein the first wall is positioned within the reservoir to separate a first portion of the reservoir from a second portion of the reservoir; and a second wall having an arcuate segment, the second wall positioned within the reservoir radially adjacent to the first wall to separate a third portion of the reservoir from the first and second portions of the reservoir.

The viscous clutch of the preceding paragraph can optionally include, additionally and/or alternatively, any one or more of the following features, configurations and/or additional components:

wherein the reservoir has an inlet bore providing an inlet to the reservoir along the fluid circuit, and wherein the inlet bore and the outlet bore are aligned at a common circumferential location;

the first and second walls can each have a free end, and the free ends can be arranged on opposite sides of the common circumferential location;

the arcuate segment of the first wall can extend about an angular range β1 with respect to an axis of the viscous clutch, the angular range β1 being greater than or equal to 330°, and the arcuate segment of the second wall can extend about an angular range β2 with respect to an axis of the viscous clutch, the angular range β2 being greater than or equal to 330°;

the first wall can further include a first end projection that radially connects the arcuate segment of the first wall to a first circumferentially-extending boundary of the reservoir, and the second wall can further include a second end projection that radially connects the arcuate segment of the second wall to a second circumferentially-extending boundary of the reservoir;

the first circumferentially-extending boundary of the reservoir can be an outer boundary, and the second circumferentially-extending boundary of the reservoir can be an inner boundary;

the first wall can be positioned closer to the outer boundary than to the second wall; and/or the first end projection can include a substantially planar portion joined to the arcuate segment by a radiused corner that protrudes radially inward from the arcuate segment.

A viscous clutch can include an input member; an output member; a working chamber defined between the input member and the output member; a reservoir to hold a supply of a shear fluid, the reservoir fluidically connected to the working chamber by a fluid circuit; an outlet to pass the shear fluid from the reservoir to the working chamber along the fluid circuit; a return bore to return the shear fluid pumped out of the working chamber along the fluid circuit; and an accumulator positioned radially inward from the reservoir and separated from the reservoir by a common circumferential wall, wherein a single bore passes radially through the common circumferential wall to fluidically link the accumulator and the reservoir.

The viscous clutch of the preceding paragraph can optionally include, additionally and/or alternatively, any one or more of the following features, configurations and/or additional components:

the accumulator and the reservoir can be axially aligned; and/or the reservoir and the accumulator can both be carried by and rotationally fixed to the input member so as to co-rotate at all times with the input member.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For instance, features of one disclosed embodiment can be utilized with other disclosed embodiments.

The invention claimed is:

1. A viscous clutch comprising:
    an input member;
    an output member;
    a working chamber defined between the input member and the output member;
    a reservoir to hold a supply of a shear fluid, the reservoir fluidically connected to the working chamber by a fluid circuit;
    an outlet to pass the shear fluid from the reservoir to the working chamber along the fluid circuit, wherein the outlet is configured as a bore in a boundary of the reservoir;
    a return bore to return the shear fluid pumped out of the working chamber along the fluid circuit;
    an accumulator to accept the shear fluid from the return bore, wherein the accumulator is arranged in series with the reservoir in the fluid circuit;
    an intermediate bore connecting the accumulator to the reservoir along the fluid circuit, wherein the intermediate bore is oriented normal to the bore of the outlet; and
    a first wall having an arcuate segment, the first wall positioned within the reservoir to separate a first portion of the reservoir from a second portion of the reservoir.

2. The viscous clutch of claim 1, wherein the reservoir is carried by the input member.

3. The viscous clutch of claim 1, wherein the input member comprises a housing, and wherein the output member comprises a rotor disk.

4. The viscous clutch of claim 1, wherein the accumulator has an axially open face.

5. The viscous clutch of claim 1 and further comprising:
    a radial wall extending across an entire radial dimension of the reservoir from an inner boundary to an outer boundary, the radial wall being spaced from the first wall and configured to prevent circumferential movement of the shear fluid across a circumferential location of the radial wall.

6. The viscous clutch of claim 1, wherein the accumulator is located upstream of the reservoir, between the return bore and the reservoir, in the fluid circuit of the viscous clutch.

7. The viscous clutch of claim 1, wherein the accumulator is located radially inward of the reservoir.

8. The viscous clutch of claim 1, wherein the accumulator is configured as an annular chamber.

9. The viscous clutch of claim 8, wherein the accumulator is further configured to allow the shear fluid to flow freely through an entire circumferential volume.

10. The viscous clutch of claim 1 and further comprising:
a reservoir plate positioned along a boundary of the reservoir, the reservoir plate extending radially, wherein the outlet is configured as a bore in the reservoir plate configured to allow the shear fluid to pass from the reservoir to the working chamber along the fluid circuit;
a separating wall between the accumulator and the reservoir; and
an intermediate bore in the separating wall to allow the shear fluid to pass from the accumulator to the reservoir along the fluid circuit, wherein the intermediate bore is oriented normal to the bore of the outlet in the reservoir plate.

11. The viscous clutch of claim 1 and further comprising:
a valve assembly configured to regulate flow of the shear fluid along the fluid circuit.

12. The viscous clutch of claim 1, wherein the arcuate segment of the first wall extends about an angular range β with respect to an axis of the viscous clutch, the angular range β being greater than 180°.

13. The viscous clutch of claim 1, wherein the arcuate segment of the first wall extends about an angular range β with respect to an axis of the viscous clutch, the angular range β being greater than 360°.

14. The viscous clutch of claim 1, wherein the reservoir is configured with an inlet portion circumferentially spaced from an outlet bore by approximately 180°.

15. The viscous clutch of claim 1, wherein the fluid circuit includes a reservoir path that traverses an angular range of at least 540°.

16. The viscous clutch of claim 1, wherein the first wall further comprises a first end projection that radially connects the arcuate segment to a first circumferentially-extending boundary of the reservoir.

17. The viscous clutch of claim 16, wherein the first wall further comprises a second end projection that radially connects the arcuate segment to a second circumferentially-extending boundary of the reservoir, the second end projection located opposite the first end projection along the arcuate segment.

18. The viscous clutch of claim 1 and further comprising:
a second wall having an arcuate segment, the second wall positioned within the reservoir radially adjacent to the first wall to separate a third portion of the reservoir from the first and second portions of the reservoir.

19. The viscous clutch of claim 18, wherein the reservoir has a first bore and a second bore, the first bore providing an inlet to the reservoir along the fluid circuit and the second bore providing the outlet from the reservoir along the fluid circuit, and wherein the first and second bores are aligned at a common circumferential location.

20. The viscous clutch of claim 19, wherein the first and second walls each have a free end, the free ends arranged on opposite sides of the common circumferential location.

21. The viscous clutch of claim 1, wherein at least a portion of the arcuate segment of the first wall has a helical shape.

22. The viscous clutch of claim 21, wherein the arcuate segment of the first wall has a circular portion at a downstream end proximate an outlet bore of the reservoir, and wherein the helically-shaped portion of the arcuate segment is located upstream of the circular portion.

23. The viscous clutch of claim 1, wherein the fluid circuit includes a reservoir path through the reservoir, and wherein a cross-sectional area of the reservoir varies along the reservoir path.

24. The viscous clutch of claim 23, wherein the cross-sectional area of the reservoir is larger at a middle portion of the reservoir path than at both an upstream end and a downstream end of the reservoir path.

25. The viscous clutch of claim 1, wherein the accumulator and the reservoir are arranged at a common axial location.

26. The viscous clutch of claim 1, wherein at least a portion of the return bore extends radially.

27. A viscous clutch comprising:
an input member;
an output member;
a working chamber defined between the input member and the output member;
a reservoir to hold a supply of a shear fluid, the reservoir fluidically connected to the working chamber by a fluid circuit;
an outlet to pass the shear fluid from the reservoir to the working chamber along the fluid circuit;
a return bore to return the shear fluid pumped out of the working chamber along the fluid circuit; and
an accumulator positioned radially inward from the reservoir and separated from the reservoir by a common circumferential wall, wherein a single bore passes radially through the common circumferential wall to fluidically link the accumulator and the reservoir.

28. The viscous clutch of claim 27, wherein the accumulator and the reservoir are axially aligned.

29. The viscous clutch of claim 27, wherein the reservoir and the accumulator are both carried by and rotationally fixed to the input member so as to co-rotate at all times with the input member.

30. A method of using the viscous clutch of claim 27, the method comprising:
pumping the shear fluid radially inward from the working chamber to the accumulator;
passing the shear fluid from the accumulator to the reservoir, the reservoir having a closed configuration;
separating a first portion of the reservoir from a second portion of the reservoir with a first arcuate wall located within the reservoir;
delivering the shear fluid from the reservoir to the working chamber; and
bringing the viscous clutch to rest in an idle condition, wherein portions of the shear fluid are retained in both the accumulator and the first portion of the reservoir in the idle condition to reduce drain back from the reservoir to the working chamber.

31. The method of claim 30, wherein the shear fluid passes from the accumulator to the reservoir in a radial direction at a single circumferential location.

32. A viscous clutch comprising:
an input member;
an output member;
a working chamber defined between the input member and the output member;
a reservoir to hold a supply of a shear fluid, the reservoir fluidically connected to the working chamber by a fluid circuit;
an outlet to pass the shear fluid from the reservoir to the working chamber along the fluid circuit;
a return bore to return the shear fluid pumped out of the working chamber along the fluid circuit;
a valve assembly configured to regulate flow of the shear fluid along the fluid circuit;

an accumulator to accept the shear fluid from the return bore, wherein the accumulator is arranged in series with the reservoir in the fluid circuit;

an intermediate bore connecting the accumulator to the reservoir along the fluid circuit; and a first wall having an arcuate segment, the first wall positioned within the reservoir to fluidically separate a first portion of the reservoir from a second portion of the reservoir in a radial direction.

33. The viscous clutch of claim 32, wherein the accumulator is located radially inward of the reservoir.

* * * * *